United States Patent
Khoshnevisan et al.

(10) Patent No.: US 11,751,174 B2
(45) Date of Patent: Sep. 5, 2023

(54) SIGNALING FOR CONFIGURING DOWNLINK TRANSMISSIONS

(71) Applicant: QUALCOMM Incorporated, San Diego, CA (US)

(72) Inventors: Mostafa Khoshnevisan, San Diego, CA (US); Xiaoxia Zhang, San Diego, CA (US); Tao Luo, San Diego, CA (US); Jing Sun, San Diego, CA (US); Arumugam Chendamarai Kannan, San Diego, CA (US); Sungwoo Park, Seoul (KR)

(73) Assignee: QUALCOMM Incorporated, San Diego, CA (US)

( * ) Notice: Subject to any disclaimer, the term of this patent is extended or adjusted under 35 U.S.C. 154(b) by 220 days.

(21) Appl. No.: 17/119,845

(22) Filed: Dec. 11, 2020

(65) Prior Publication Data

US 2021/0227526 A1 Jul. 22, 2021

Related U.S. Application Data

(60) Provisional application No. 62/961,954, filed on Jan. 16, 2020.

(51) Int. Cl.
*H04W 72/04* (2023.01)
*H04W 24/02* (2009.01)
(Continued)

(52) U.S. Cl.
CPC ......... *H04W 72/044* (2013.01); *H04W 24/02* (2013.01); *H04W 72/23* (2023.01)

(58) Field of Classification Search
CPC ... H04L 5/0053; H04L 5/0094; H04L 5/0051; H04W 24/02; H04W 72/044; H04W 72/042; H04B 7/0695
See application file for complete search history.

(56) References Cited

U.S. PATENT DOCUMENTS

2020/0100248 A1* 3/2020 Kim .................. H04L 5/0092
2021/0219336 A1* 7/2021 Fan .................... H04W 74/04
(Continued)

FOREIGN PATENT DOCUMENTS

CN 110167091 A 8/2019
WO WO-2019099659 A1 5/2019
(Continued)

OTHER PUBLICATIONS

International Search Report and Written Opinion—PCT/US2020/064820—ISA/EPO—dated Mar. 12, 2021 (201506WO).
(Continued)

*Primary Examiner* — Maharishi V Khirodhar
*Assistant Examiner* — Kenneth P Hunt
(74) *Attorney, Agent, or Firm* — Holland & Hart LLP/Qualcomm Incorporated

(57) ABSTRACT

Methods, systems, and devices for signaling for configuring downlink transmissions are described. A user equipment (UE) may receive a configuration message from a base station indicating that a control resource set (CORESET) for a downlink control channel is associated with a set of transmission configuration indicator (TCI) states. The UE may subsequently receive a control message from the base station activating one or more of the TCI states. The UE may decode the downlink control channel based on the configuration message and the one or more activated TCI states. The UE may identify one or more TCI states (e.g., associated with the CORESET) to apply to a reception of a physical downlink shared channel (PDSCH) transmission. The UE may determine to apply one or more of the TCI states activated by the control message. The UE may determine to apply one or more different TCI states.

30 Claims, 22 Drawing Sheets

(51) Int. Cl.
*H04W 72/044* (2023.01)
*H04W 72/23* (2023.01)

(56) References Cited

U.S. PATENT DOCUMENTS

2021/0273699 A1* 9/2021 Cao ..................... H04L 5/0094
2021/0329611 A1* 10/2021 Karjalainen ......... H04B 7/0695
2022/0131602 A1* 4/2022 Liberg .................. H04B 7/088
2022/0256522 A1* 8/2022 Matsumura ....... H04W 72/0406

FOREIGN PATENT DOCUMENTS

WO WO-2019153347 A1 8/2019
WO WO-2019192472 A1 10/2019

OTHER PUBLICATIONS

ZTE: "Enhancements on Multi-TRP and Multi-Panel Transmission", 3GPP TSG RAN WG1 #98, 3GPP Draft; R1-1908191 Enhancements ON Multi-TRP and Multi-Panel Transmission, 3rd Generation Partnership Project (3GPP), Mobile Competence Centre; 650, Route Des Lucioles; F-06921 Sophia-Antipolis, vol. RAN WG1, No. Prague, CZ; Aug. 26, 2019-Aug. 30, 2019, Aug. 17, 2019 (Aug. 17, 2019), 21 Pages, XP051764810, Retrieved from the Internet: URL: http://www.3gpp.org/ftp/tsg_ran/WG1_RL1/TSGR1 98/Docs/R1-1908191.zip [retrieved on Aug. 17, 2019] the whole document.

* cited by examiner

SIGNALING FOR CONFIGURING DOWNLINK TRANSMISSIONS

CROSS REFERENCE

The present Application for Patent claims the benefit of U.S. Provisional patent Application No. 62/961,954 by KHOSHNEVISAN et al., entitled "SIGNALING FOR CONFIGURING DOWNLINK TRANSMISSIONS," filed Jan. 16, 2020, assigned to the assignee hereof, and expressly incorporated herein.

FIELD OF TECHNOLOGY

The following relates generally to wireless communications and more specifically to signaling for configuring downlink transmissions.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, a base station may transmit control information to a UE via a physical downlink control channel (PDCCH) using a set of resources. The PDCCH may include demodulation reference signals (DMRSs) and coded bits of downlink control information (DCI). A base station may transmit a PDCCH using a physical layer, associated with an antenna port and transmission configuration indicator (TCI) state. In some cases, the reliability of the network may rely on the reliability of each channel which may become unreliable and may adversely impact network performance.

SUMMARY

The described techniques relate to improved methods, systems, devices, and apparatuses that support signaling for configuring downlink transmissions. Generally, the described techniques provide for configuring physical downlink control channel (PDCCH) and physical downlink shared channel (PDSCH) transmissions. More specifically, PDCCH transmissions may by transmitted using a control resource set (CORESET) including one or more resource elements (REs). Each CORESET may be associated with a set of transmission configuration indicator (TCI) states. A base station may transmit a PDCCH or PDSCH transmission according to one or more activated TCI states (e.g., of the set of TCI states associated with CORESET) and the UE may apply the one or more activated TCI states to receive and decode the PDCCH or PDSCH transmissions. The base station may indicate the one or more activated TCI states to the user equipment (UE) to enable the UE to receive and decode the PDCCH or PDSCH transmission.

A method for wireless communication by a UE is described. The method may include identifying that a CORESET for a downlink control channel is associated with a set of multiple TCI states, receiving, from a base station, a control message activating one or more TCI states of the set of multiple TCI states for the CORESET, and decoding the downlink control channel based on the one or more activated TCI states.

An apparatus for wireless communication by a UE is described. The apparatus may include a processor, memory coupled with the processor, and instructions stored in the memory. The instructions may be executable by the processor to cause the apparatus to identify that a CORESET for a downlink control channel is associated with a set of multiple TCI states, receive, from a base station, a control message activating one or more TCI states of the set of multiple TCI states for the CORESET, and decode the downlink control channel based on the one or more activated TCI states.

Another apparatus for wireless communication by a UE is described. The apparatus may include means for identifying that a CORESET for a downlink control channel is associated with a set of multiple TCI states, means for receiving, from a base station, a control message activating one or more TCI states of the set of multiple TCI states for the CORESET, and means for decoding the downlink control channel based on the one or more activated TCI states.

A non-transitory computer-readable medium storing code for wireless communication by a UE is described. The code may include instructions executable by a processor to identify that a CORESET for a downlink control channel is associated with a set of multiple TCI states, receive, from a base station, a control message activating one or more TCI states of the set of multiple TCI states for the CORESET, and decode the downlink control channel based on the one or more activated TCI states.

Some examples of the method, apparatus, and non-transitory computer-readable medium described herein may further include operations, features, means, or instructions for receiving, from the base station, a configuration message indicating that the CORESET for the downlink control channel is associated with the set of TCI states.

Some examples of the method, apparatuses, and non-transitory computer-readable medium described herein may further include operations, features, means, or instructions for determining, based on an indication within the control message, that a single TCI state may be activated for the CORESET and identifying a first TCI state that may be activated based on the indication, where the one or more activated TCI states includes the first TCI state.

Some examples of the method, apparatuses, and non-transitory computer-readable medium described herein may further include operations, features, means, or instructions for determining, based on an indication within the control message, that two TCI states may be activated for the CORESET, identifying a first TCI state that may be activated based on the indication, and identifying a second TCI state that may be activated based on the indication, where the one or more activated TCI states includes the first TCI state and the second TCI state.

In some examples of the method, apparatuses, and non-transitory computer-readable medium described herein, receiving the control message may include operations, features, means, or instructions for receiving an indication of the one or more activated TCI states, where the indication includes one or more TCI state identifications (IDs).

In some examples of the method, apparatuses, and non-transitory computer-readable medium described herein, receiving the control message may include operations, features, means, or instructions for receiving an indication of the one or more activated TCI states, where the indication includes one or more indices associated with the one or more activated TCI states.

In some examples of the method, apparatuses, and non-transitory computer-readable medium described herein, the control message includes a first field configured to indicate a first TCI state, a second field configured to indicate a second TCI state, and a third field configured to indicate whether the TCI state of the first TCI state or the first TCI state and the second TCI state may be activated.

In some examples of the method, apparatuses, and non-transitory computer-readable medium described herein, the third field is configured to indicate whether the control message includes the second field.

In some examples of the method, apparatuses, and non-transitory computer-readable medium described herein, the control message includes a dynamic number of fields based on a quantity of activated TCI states.

In some examples of the method, apparatuses, and non-transitory computer-readable medium described herein, the configuration message further indicates that the set of multiple TCI states may be mapped using either a frequency division multiplexing (FDM) mapping, a time division multiplexing (TDM) mapping, or a space division multiplexing mapping.

In some examples of the method, apparatuses, and non-transitory computer-readable medium described herein, the configuration message further indicates parameters for mapping the set of multiple TCI states using at least two of a FDM mapping scheme, a TDM mapping scheme, and a space division multiplexing mapping scheme and the control message indicates one of the FDM mapping scheme, the TDM mapping scheme, or the space division multiplexing mapping scheme for mapping of the one or more activated TCI states.

In some examples of the method, apparatuses, and non-transitory computer-readable medium described herein, the control message includes an indication of a group of component carriers (CCs) to which the control message pertains.

In some examples of the method, apparatuses, and non-transitory computer-readable medium described herein, the control message may be a medium access control-control element (MAC-CE).

In some examples of the method, apparatuses, and non-transitory computer-readable medium described herein, the configuration message may be a radio resource control (RRC) message.

A method for wireless communication by a base station is described. The method may include identifying a configuration indicating that a CORESET for a downlink control channel is associated with a set of multiple TCI states, transmitting, to a UE, a configuration message indicating the identified configuration, and transmitting, to the UE, a control message activating one or more TCI states of the set of multiple TCI states for the CORESET.

An apparatus for wireless communication by a base station is described. The apparatus may include a processor, memory coupled with the processor, and instructions stored in the memory. The instructions may be executable by the processor to cause the apparatus to identify a configuration indicating that a CORESET for a downlink control channel is associated with a set of multiple TCI states, transmit, to a UE, a configuration message indicating the identified configuration, and transmit, to the UE, a control message activating one or more TCI states of the set of multiple TCI states for the CORESET.

Another apparatus for wireless communication by a base station is described. The apparatus may include means for identifying a configuration indicating that a CORESET for a downlink control channel is associated with a set of multiple TCI states, means for transmitting, to a UE, a configuration message indicating the identified configuration, and means for transmitting, to the UE, a control message activating one or more TCI states of the set of multiple TCI states for the CORESET.

A non-transitory computer-readable medium storing code for wireless communication by a base station is described. The code may include instructions executable by a processor to identify a configuration indicating that a CORESET for a downlink control channel is associated with a set of multiple TCI states, transmit, to a UE, a configuration message indicating the identified configuration, and transmit, to the UE, a control message activating one or more TCI states of the set of multiple TCI states for the CORESET.

Some examples of the method, apparatuses, and non-transitory computer-readable medium described herein may further include operations, features, means, or instructions for transmitting, to the UE, a downlink control message via the downlink control channel according to the one or more activated TCI states for the CORESET.

In some examples of the method, apparatuses, and non-transitory computer-readable medium described herein, the control message includes an indication that a single TCI state may be activated for the CORESET, the indication indicates a first TCI state that may be activated, and the one or more activated TCI states include the first TCI state.

In some examples of the method, apparatuses, and non-transitory computer-readable medium described herein, the control message includes an indication that two TCI states may be activated for the CORESET, the indication indicates that a first TCI state and a second TCI state may be activated, and the one or more activated TCI states include the first TCI state and the second TCI state.

In some examples of the method, apparatuses, and non-transitory computer-readable medium described herein, transmitting the configuration message may include operations, features, means, or instructions for transmitting an indication of the one or more activated TCI states, where the indication includes a TCI state ID.

In some examples of the method, apparatuses, and non-transitory computer-readable medium described herein, transmitting the configuration message may include operations, features, means, or instructions for transmitting an indication of the one or more TCI states, where the indication includes one or more indices associated with the one or more activated TCI states.

In some examples of the method, apparatuses, and non-transitory computer-readable medium described herein, the control message includes a first field configured to indicate a first TCI state, a second field configured to indicate a second TCI state, and a third field configured to indicate which TCI state of the first TCI state, the second TCI state, or both TCI states may be activated.

In some examples of the method, apparatuses, and non-transitory computer-readable medium described herein, the control message includes a dynamic number of fields based on a quantity of activated TCI states.

In some examples of the method, apparatuses, and non-transitory computer-readable medium described herein, the configuration message further indicates that the set of multiple TCI states may be mapped using either an FDM mapping, a TDM mapping, or a space division multiplexing mapping.

In some examples of the method, apparatuses, and non-transitory computer-readable medium described herein, the configuration message further indicates parameters for mapping the set of multiple TCI states using at least two of a FDM mapping scheme, a TDM mapping scheme, and a space division multiplexing mapping scheme and the control message indicates one of the FDM mapping scheme, the TDM mapping scheme, or the space division multiplexing mapping scheme for mapping of the one or more activated TCI states.

In some examples of the method, apparatuses, and non-transitory computer-readable medium described herein, the control message includes an indication of a group of CCs to which the control message pertains.

In some examples of the method, apparatuses, and non-transitory computer-readable medium described herein, the control message may be a MAC-CE.

In some examples of the method, apparatuses, and non-transitory computer-readable medium described herein, the configuration message may be an RRC message.

A method for wireless communications at a UE is described. The method may include receiving, from a base station, a configuration message indicating that a CORESET is associated with a set of multiple activated TCI states, receiving a physical downlink control transmission over the CORESET in accordance with the configuration message, the physical downlink control transmission including scheduling information for a physical downlink shared channel (PDSCH) transmission, identifying, based on an absence of a TCI field included in the scheduling information that indicates a TCI state for the PDSCH transmission, at least one TCI state of the set of activated TCI states to apply to a reception of the PDSCH transmission, and decoding the PDSCH transmission in accordance with the at least one TCI state.

An apparatus for wireless communications at a UE is described. The apparatus may include a processor, memory coupled with the processor, and instructions stored in the memory. The instructions may be executable by the processor to cause the apparatus to receive, from a base station, a configuration message indicating that a CORESET is associated with a set of multiple activated TCI states, receive a physical downlink control transmission over the CORESET in accordance with the configuration message, the physical downlink control transmission including scheduling information for a PDSCH transmission, identify, based on an absence of a TCI field included in the scheduling information that indicates a TCI state for the PDSCH transmission, at least one TCI state of the set of activated TCI states to apply to a reception of the PDSCH transmission, and decode the PDSCH transmission in accordance with the at least one TCI state.

Another apparatus for wireless communications at a UE is described. The apparatus may include means for receiving, from a base station, a configuration message indicating that a CORESET is associated with a set of multiple activated TCI states, means for receiving a physical downlink control transmission over the CORESET in accordance with the configuration message, the physical downlink control transmission including scheduling information for a PDSCH transmission, means for identifying, based on an absence of a TCI field included in the scheduling information that indicates a TCI state for the PDSCH transmission, at least one TCI state of the set of activated TCI states to apply to a reception of the PDSCH transmission, and means for decoding the PDSCH transmission in accordance with the at least one TCI state.

A non-transitory computer-readable medium storing code for wireless communications at a UE is described. The code may include instructions executable by a processor to receive, from a base station, a configuration message indicating that a CORESET is associated with a set of multiple activated TCI states, receive a physical downlink control transmission over the CORESET in accordance with the configuration message, the physical downlink control transmission including scheduling information for a PDSCH transmission, identify, based on an absence of a TCI field included in the scheduling information that indicates a TCI state for the PDSCH transmission, at least one TCI state of the set of activated TCI states to apply to a reception of the PDSCH transmission, and decode the PDSCH transmission in accordance with the at least one TCI state.

In some examples of the method, apparatuses, and non-transitory computer-readable medium described herein, the identifying may be based on a scheduling offset for the PDSCH transmission that may be larger than a threshold scheduling offset.

In some examples of the method, apparatuses, and non-transitory computer-readable medium described herein, the threshold scheduling offset may be a time duration for quasi colocation (QCL).

Some examples of the method, apparatuses, and non-transitory computer-readable medium described herein may further include operations, features, means, or instructions for receiving, from the base station, a control message activating two TCI states for the CORESET, where the at least one TCI state to apply to the reception of the PDSCH transmission includes at least one of the two activated TCI states.

Some examples of the method, apparatuses, and non-transitory computer-readable medium described herein may further include operations, features, means, or instructions for determining, based on the scheduling information for the PDSCH transmission, to apply one of the two activated TCI states to the reception of the PDSCH transmission.

Some examples of the method, apparatuses, and non-transitory computer-readable medium described herein may further include operations, features, means, or instructions for identifying one of the two activated TCI states to apply to the reception of the PDSCH transmission based on a relative value of a TCI state ID for each of the two activated TCI states or a relative position of two fields within the control message each indicating one of the two activated TCI states.

Some examples of the method, apparatuses, and non-transitory computer-readable medium described herein may further include operations, features, means, or instructions for determining, based on the scheduling information for the PDSCH transmission, to apply both of the two activated TCI states to the reception of the PDSCH transmission.

Some examples of the method, apparatuses, and non-transitory computer-readable medium described herein may further include operations, features, means, or instructions for decoding the physical downlink control transmission based on the configuration message and at least one of the two activated TCI states.

A method for wireless communications at a UE is described. The method may include receiving, from a base station, a configuration message indicating that a CORESET is associated with a set of multiple activated TCI states, receiving a physical downlink control transmission, the physical downlink control transmission including scheduling information for a PDSCH transmission, identifying, based on a scheduling offset for the PDSCH transmission being less than a threshold scheduling offset, at least one TCI state of the set of activated TCI states to apply to a reception of the PDSCH transmission, and decoding the PDSCH transmission in accordance with the at least one TCI state.

An apparatus for wireless communications at a UE is described. The apparatus may include a processor, memory coupled with the processor, and instructions stored in the memory. The instructions may be executable by the processor to cause the apparatus to receive, from a base station, a configuration message indicating that a CORESET is associated with a set of multiple activated TCI states, receive a physical downlink control transmission, the physical downlink control transmission including scheduling information for a PDSCH transmission, identify, based on a scheduling offset for the PDSCH transmission being less than a threshold scheduling offset, at least one TCI state of the set of activated TCI states to apply to a reception of the PDSCH transmission, and decode the PDSCH transmission in accordance with the at least one TCI state.

Another apparatus for wireless communications at a UE is described. The apparatus may include means for receiving, from a base station, a configuration message indicating that a CORESET is associated with a set of multiple activated TCI states, means for receiving a physical downlink control transmission, the physical downlink control transmission including scheduling information for a PDSCH transmission, means for identifying, based on a scheduling offset for the PDSCH transmission being less than a threshold scheduling offset, at least one TCI state of the set of activated TCI states to apply to a reception of the PDSCH transmission, and means for decoding the PDSCH transmission in accordance with the at least one TCI state.

A non-transitory computer-readable medium storing code for wireless communications at a UE is described. The code may include instructions executable by a processor to receive, from a base station, a configuration message indicating that a CORESET is associated with a set of multiple activated TCI states, receive a physical downlink control transmission, the physical downlink control transmission including scheduling information for a PDSCH transmission, identify, based on a scheduling offset for the PDSCH transmission being less than a threshold scheduling offset, at least one TCI state of the set of activated TCI states to apply to a reception of the PDSCH transmission, and decode the PDSCH transmission in accordance with the at least one TCI state.

In some examples of the method, apparatuses, and non-transitory computer-readable medium described herein, the threshold scheduling offset may be a time duration for QCL.

Some examples of the method, apparatuses, and non-transitory computer-readable medium described herein may further include operations, features, means, or instructions for identifying one or more CORESETs each associated with a transmission received prior to decoding the PDSCH transmission, determining a subset of the one or more CORESETs that excludes CORESETs of the one or more CORESETs that may be associated with a set of multiple activated TCI states, and identifying a CORESET from the subset of the one or more CORESETs having a CORESET ID with a value less than each CORESET ID of other CORESETs from the subset of the one or more CORESETs, where the at least one TCI state to apply to the reception of the PDSCH transmission includes a TCI state associated with the identified CORESET having the CORESET ID with the value less than each CORESET ID of other CORESETs.

Some examples of the method, apparatuses, and non-transitory computer-readable medium described herein may further include operations, features, means, or instructions for identifying the CORESET associated with two activated TCI states, where the at least one TCI state to apply to the reception of the PDSCH transmission includes at least one of the two activated TCI states.

In some examples of the method, apparatuses, and non-transitory computer-readable medium described herein, identifying the CORESET may include operations, features, means, or instructions for identifying one or more CORESETs associated with a transmission received prior to identifying the CORESET and determining that a CORESET ID with a lowest value from each CORESET ID of the one or more CORESETs may be the CORESET ID identifying the CORESET.

Some examples of the method, apparatuses, and non-transitory computer-readable medium described herein may further include operations, features, means, or instructions for determining to apply one of the two activated TCI states to the reception of the PDSCH transmission.

Some examples of the method, apparatuses, and non-transitory computer-readable medium described herein may further include operations, features, means, or instructions for identifying one of the two activated TCI states to apply to the reception of the PDSCH transmission based on a relative value of a TCI state ID for each of the two activated TCI states or a relative position of two fields within a control message each indicating one of the two activated TCI states.

Some examples of the method, apparatuses, and non-transitory computer-readable medium described herein may further include operations, features, means, or instructions for determining to apply both of the two activated TCI states to the reception of the PDSCH transmission.

Some examples of the method, apparatuses, and non-transitory computer-readable medium described herein may further include operations, features, means, or instructions for decoding the physical downlink control transmission based on the configuration message and at least one of the two activated TCI states.

A method for wireless communications at a base station is described. The method may include transmitting, to a UE, a configuration message indicating that a CORESET is associated with a set of multiple activated TCI states, transmitting, to the UE, a physical downlink control transmission over the CORESET in accordance with the configuration message, the physical downlink control transmission including scheduling information for a PDSCH transmission, identifying, based on an absence of a TCI field included in the scheduling information that indicates a TCI state for the PDSCH transmission, at least one TCI state of the set of activated TCI states to apply to a transmission of the PDSCH transmission, and transmitting the PDSCH transmission in accordance with the at least one TCI state.

An apparatus for wireless communications at a base station is described. The apparatus may include a processor, memory coupled with the processor, and instructions stored in the memory. The instructions may be executable by the processor to cause the apparatus to transmit, to a UE, a configuration message indicating that a CORESET is associated with a set of multiple activated TCI states, transmit, to the UE, a physical downlink control transmission over the CORESET in accordance with the configuration message, the physical downlink control transmission including scheduling information for a PDSCH transmission, identify, based on an absence of a TCI field included in the scheduling information that indicates a TCI state for the PDSCH transmission, at least one TCI state of the set of activated TCI states to apply to a transmission of the PDSCH transmission, and transmit the PDSCH transmission in accordance with the at least one TCI state.

Another apparatus for wireless communications at a base station is described. The apparatus may include means for transmitting, to a UE, a configuration message indicating that a CORESET is associated with a set of multiple activated TCI states, means for transmitting, to the UE, a physical downlink control transmission over the CORESET in accordance with the configuration message, the physical downlink control transmission including scheduling information for a PDSCH transmission, means for identifying, based on an absence of a TCI field included in the scheduling information that indicates a TCI state for the PDSCH transmission, at least one TCI state of the set of activated TCI states to apply to a transmission of the PDSCH transmission, and means for transmitting the PDSCH transmission in accordance with the at least one TCI state.

A non-transitory computer-readable medium storing code for wireless communications at a base station is described. The code may include instructions executable by a processor to transmit, to a UE, a configuration message indicating that a CORESET is associated with a set of multiple activated TCI states, transmit, to the UE, a physical downlink control transmission over the CORESET in accordance with the configuration message, the physical downlink control transmission including scheduling information for a PDSCH transmission, identify, based on an absence of a TCI field included in the scheduling information that indicates a TCI state for the PDSCH transmission, at least one TCI state of the set of activated TCI states to apply to a transmission of the PDSCH transmission, and transmit the PDSCH transmission in accordance with the at least one TCI state.

In some examples of the method, apparatuses, and non-transitory computer-readable medium described herein, the scheduling information for the PDSCH transmission defines a scheduling offset for the PDSCH transmission that may be larger than a threshold scheduling offset.

In some examples of the method, apparatuses, and non-transitory computer-readable medium described herein, the threshold scheduling offset may be a time duration for QCL.

Some examples of the method, apparatuses, and non-transitory computer-readable medium described herein may further include operations, features, means, or instructions for transmitting, to the UE, a control message activating two TCI states for the CORESET, where the at least one TCI state to apply to the reception of the PDSCH transmission includes at least one of the two activated TCI states.

In some examples of the method, apparatuses, and non-transitory computer-readable medium described herein, transmitting the PDSCH transmission may include operations, features, means, or instructions for transmitting the PDSCH transmission in accordance with one of the two activated TCI states.

Some examples of the method, apparatuses, and non-transitory computer-readable medium described herein may further include operations, features, means, or instructions for identifying the one of the two activated TCI states to apply to the reception of the PDSCH transmission based on a relative value of a TCI state ID for each of the two activated TCI states or a relative position of two fields within the control message each indicating one of the two activated TCI states.

In some examples of the method, apparatuses, and non-transitory computer-readable medium described herein, transmitting the PDSCH transmission may include operations, features, means, or instructions for transmitting the PDSCH transmission in accordance with both of the two activated TCI states.

Some examples of the method, apparatuses, and non-transitory computer-readable medium described herein may further include operations, features, means, or instructions for transmitting the physical downlink control transmission based on the configuration message and at least one of the two activated TCI states.

A method for wireless communications at a base station is described. The method may include transmitting, to a UE, a configuration message indicating that a CORESET is associated with a set of multiple activated TCI states, transmitting, to the UE, a physical downlink control transmission, the physical downlink control transmission including scheduling information for a PDSCH transmission, identifying, based on a scheduling offset for the PDSCH transmission being less than a threshold scheduling offset, at least one TCI state of the set of activated TCI states to apply to a transmission of the PDSCH transmission, and transmitting the PDSCH transmission in accordance with the at least one TCI state.

An apparatus for wireless communications at a base station is described. The apparatus may include a processor, memory coupled with the processor, and instructions stored in the memory. The instructions may be executable by the processor to cause the apparatus to transmit, to a UE, a configuration message indicating that a CORESET is associated with a set of multiple activated TCI states, transmit, to the UE, a physical downlink control transmission, the physical downlink control transmission including scheduling information for a PDSCH transmission, identify, based on a scheduling offset for the PDSCH transmission being less than a threshold scheduling offset, at least one TCI state of the set of activated TCI states to apply to a transmission of the PDSCH transmission, and transmit the PDSCH transmission in accordance with the at least one TCI state.

Another apparatus for wireless communications at a base station is described. The apparatus may include means for transmitting, to a UE, a configuration message indicating that a CORESET is associated with a set of multiple activated TCI states, means for transmitting, to the UE, a physical downlink control transmission, the physical downlink control transmission including scheduling information for a PDSCH transmission, means for identifying, based on a scheduling offset for the PDSCH transmission being less than a threshold scheduling offset, at least one TCI state of the set of activated TCI states to apply to a transmission of the PDSCH transmission, and means for transmitting the PDSCH transmission in accordance with the at least one TCI state.

A non-transitory computer-readable medium storing code for wireless communications at a base station is described. The code may include instructions executable by a processor to transmit, to a UE, a configuration message indicating that a CORESET is associated with a set of multiple activated TCI states, transmit, to the UE, a physical downlink control transmission, the physical downlink control transmission including scheduling information for a PDSCH transmission, identify, based on a scheduling offset for the PDSCH transmission being less than a threshold scheduling offset, at least one TCI state of the set of activated TCI states to apply to a transmission of the PDSCH transmission, and transmit the PDSCH transmission in accordance with the at least one TCI state.

In some examples of the method, apparatuses, and non-transitory computer-readable medium described herein, the threshold scheduling offset may be a time duration for QCL.

Some examples of the method, apparatuses, and non-transitory computer-readable medium described herein may further include operations, features, means, or instructions for identifying the CORESET associated with two activated TCI states, where the at least one TCI state to apply to the reception of the PDSCH transmission includes at least one of the two activated TCI states.

In some examples of the method, apparatuses, and non-transitory computer-readable medium described herein, identifying the CORESET may include operations, features, means, or instructions for identifying one or more CORESETs associated with a transmission transmitted prior to identifying the CORESET and determining that a CORESET ID with a lowest value from each CORESET ID of the one or more CORESETs may be the CORESET ID identifying the CORESET.

In some examples of the method, apparatuses, and non-transitory computer-readable medium described herein, transmitting the PDSCH transmission may include operations, features, means, or instructions for transmitting the PDSCH transmission in accordance with one of the two activated TCI states.

Some examples of the method, apparatuses, and non-transitory computer-readable medium described herein may further include operations, features, means, or instructions for identifying the one of the two activated TCI states to apply to the reception of the PDSCH transmission based on a relative value of a TCI state ID for each of the two activated TCI states or a relative position of two fields within a control message each indicating one of the two activated TCI states.

In some examples of the method, apparatuses, and non-transitory computer-readable medium described herein, transmitting the PDSCH transmission may include operations, features, means, or instructions for transmitting the PDSCH transmission in accordance with both of the two activated TCI states.

Some examples of the method, apparatuses, and non-transitory computer-readable medium described herein may further include operations, features, means, or instructions for transmitting the physical downlink control transmission based on the configuration message and at least one of the two activated TCI states.

DETAILED DESCRIPTION

Figure 1:
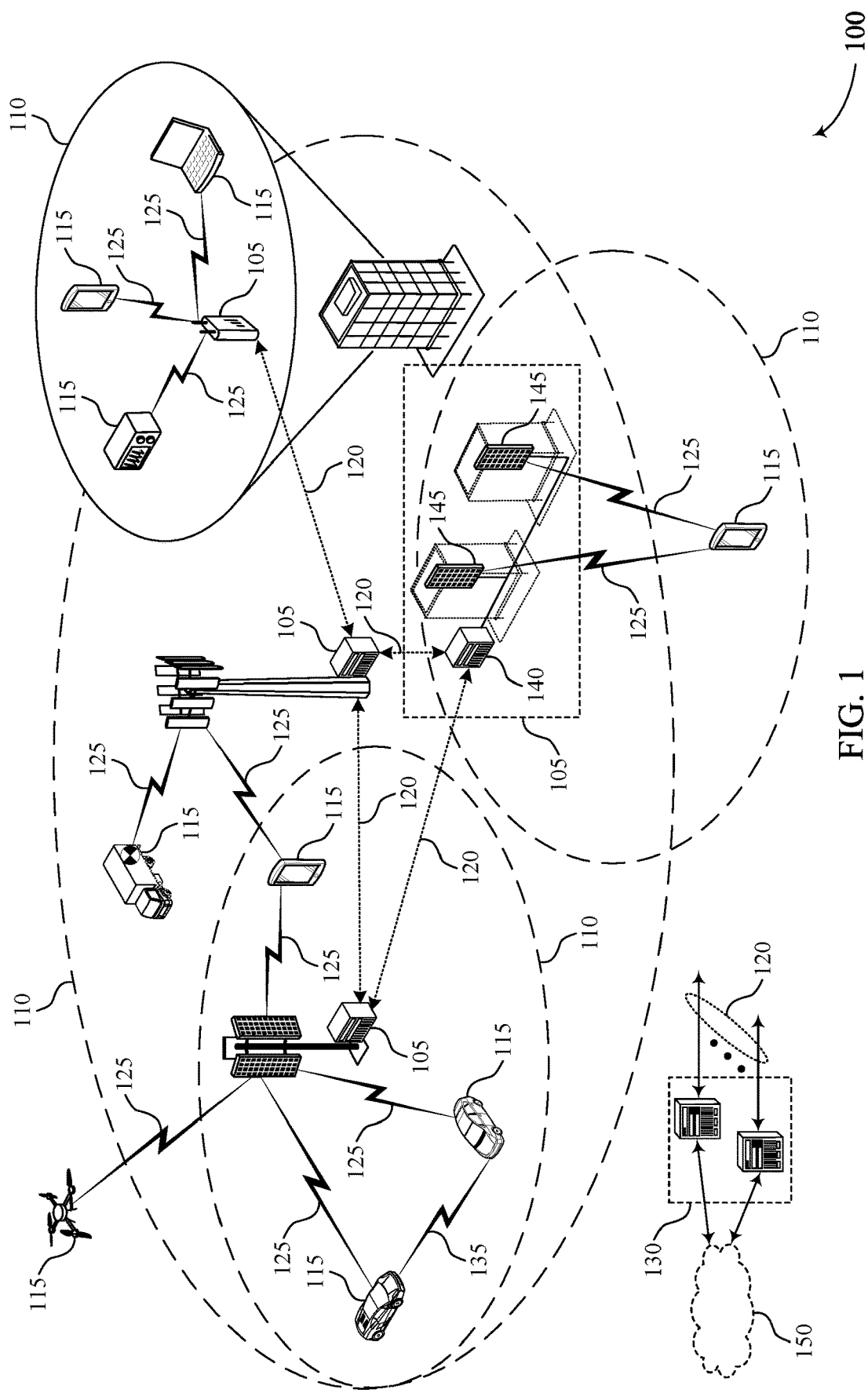
FIGS. 1 and 2 illustrate examples of systems for wireless communications that support signaling for configuring downlink transmissions in accordance with aspects of the present disclosure.

In some wireless communications systems, a base station may transmit control information to a user equipment (UE) via a physical downlink control channel (PDCCH) using a control resource set (CORESET). A CORESET may include one or more resource element groups (REGs) that may include one or more resource elements (REs) for transmitting the PDCCH. A base station may transmit a PDCCH associated with a CORESET using one or more activated transmission configuration indicator (TCI) states. A base station may also transmit a physical downlink shared channel (PDSCH) transmission using one or more activated TCI states. Different TCI states may correspond to QCL relationships with different reference signal transmissions. That is, a UE may measure a reference signal using receive beamforming parameters based on a TCI state indicated for the reference signal transmission from a base station. Therefore, a UE and a base station may each determine the one or more activated TCI states to transmit and receive the downlink transmissions using the one or more activated TCI states.

In some cases, a UE and base station may be configured to use a single TCI state for PDCCH transmissions. Here, the UE and base station may be configured to use one or more activated TCI states for PDCCH transmissions. This may be implemented to realize one or more advantages. For example, two activated TCI states may increase a diversity of the transmissions and therefore a reliability of the transmissions. Here, the base station may be configured to indicate one activated TCI state or more than one activated TCI state (e.g., two activated TCI states) to the UE prior to transmitting a PDCCH transmission. Therefore, the base station and UE may be operable to use more than one activated TCI state for PDCCH transmissions increasing a reliability of the PDCCH transmission when compared to a PDCCH transmission associated with only a single TCI state. As such, supported techniques may include improved network operations and, in some examples, may promote network efficiencies, among other benefits.

The base station may transmit a radio resource control (RRC) message to the UE indicating CORESET configurations. For example, the base station may transmit an RRC message or configuration message to indicate a list of TCI states associated with a CORESET. The base station may subsequently transmit a medium access control-control element (MAC-CE) to activate one or more TCI states for the CORESET. The MAC-CE may be dynamically sized, where the size of the MAC-CE increases as a quantity of activated TCI states increases. Alternatively, the MAC-CE may be a fixed size and may include an indication of a quantity of activated TCI states. In either case, the MAC-CE may indicate one or more activated TCI states (e.g., by TCI state identifiers (IDs), by an index associated with a TCI state). The base station may then transmit a PDCCH transmission using the activated TCI states. The UE may monitor the CORESET for the PDCCH transmission and decode the PDCCH transmission based on the activated TCI states.

The PDCCH transmission may include one or more fields indicating at least one activated TCI state for a PDSCH transmission. The base station may transmit the PDSCH transmission using the indicated TCI states (e.g., indicated within the PDCCH transmission) and the UE may decode the PDSCH transmission based on the indicated TCI states. In some other cases, the UE may not determine which TCI states are indicated for the PDSCH transmission based on an indication within the PDCCH transmission. For example, the PDCCH may fail to include a field indicating one or more activated TCI states for the PDSCH transmission. Here, the UE and base station may use one or more of the activated TCI states associated with the PDCCH transmission for the PDSCH transmission. In another example, a scheduling offset associated with the PDSCH transmission and indicated within the PDCCH transmission may be less than a time duration for QCL. Here, the UE and base station may use a default QCL assumption for the PDSCH transmission that is the QCL relationship or TCI state of the CORESET associated with a monitored search space with the lowest CORESET ID in the latest slot in which one or more CORESETs within the active bandwidth part (BWP) of the base station are monitored by the UE.

Aspects of the disclosure are initially described in the context of a wireless communications system. Aspects of the disclosure are then described in the context of a second wireless communications system, configurations, and process flows. Aspects of the disclosure are further illustrated by and described with reference to apparatus diagrams, system diagrams, and flowcharts that relate to signaling for configuring downlink transmissions.

FIG. 1 illustrates an example of a wireless communications system 100 that supports signaling for configuring downlink transmissions in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a BWP) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers (CCs) and one or more uplink CCs according to a carrier aggregation configuration. Carrier aggregation may be used with both frequency division duplexing (FDD) and time division duplexing (TDD) CCs.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a RE may consist of one symbol period (e.g., a duration of one modulation symbol) and one subcarrier, where the symbol period and subcarrier spacing are inversely related. The number of bits carried by each RE may depend on the modulation scheme (e.g., the order of the modulation scheme, the coding rate of the modulation scheme, or both). Thus, the more REs that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a CORESET (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, for example, in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with CCs operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 may transmit PDCCH and PDSCH transmissions to a UE 115. The base station 105 may transmit PDCCH transmissions using a CORESET including one or more REs. Each CORESET may be associated with a set of TCI states. A base station 105 may transmit a PDCCH or PDSCH transmission according to one or more activated TCI states (e.g., of the set of TCI states associated with CORESET) and the UE 115 may apply the one or more activated TCI states to receive and decode the PDCCH or PDSCH transmissions. The base station 105 may indicate the one or more activated TCI states to the UE 115 to enable the UE 115 to receive and decode the PDCCH or PDSCH transmission.

Figure 2:
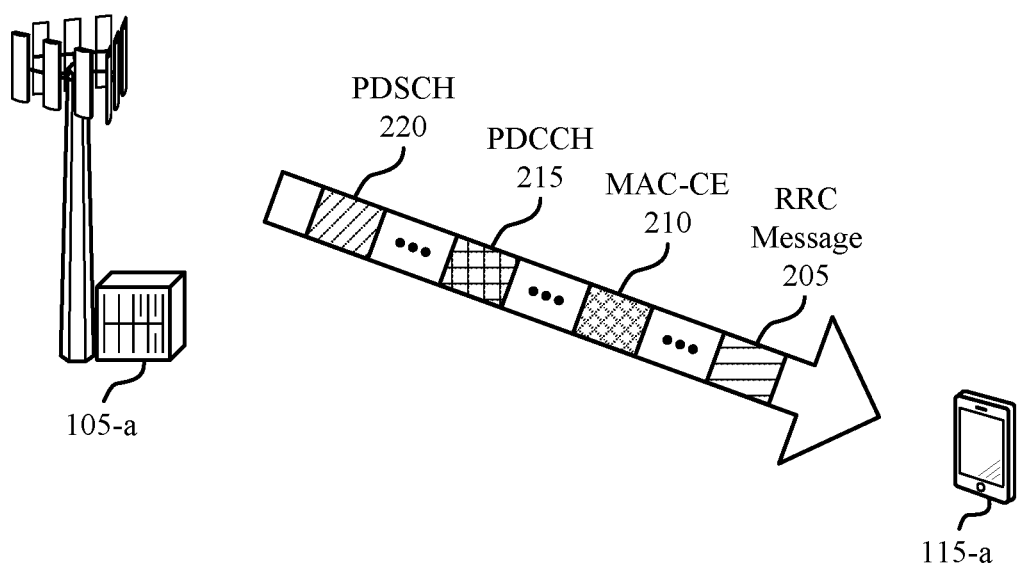

FIG. 2 illustrates an example of a wireless communications system 200 that supports signaling for configuring downlink transmissions in accordance with aspects of the present disclosure. In some examples, wireless communications system 200 may implement aspects of wireless communications system 100 such as base station 105-a and UE 115-a, which may be examples of base stations 105 and UEs 115 as described with reference to FIG. 1.

Base station 105-a may communicate an RRC message 205 to UE 115-a. The RRC message 205 (e.g., a configuration message) may configure one or more CORESETs. For example, the RRC message 205 may include an indication of the CORESET ID and a list of TCI state IDs for the CORESET. That is, each CORESET may be configured with up to 64 TCI states from a total number of 128 TCI states. The total number of TCI states may be defined in a PDSCH configuration and included in an information element (e.g., the BWP-DownlinkDedicated information element). The RRC message 205 may indicate (e.g., by TCI-StatesPDCCH-ToAddList and TCI-StatesPDCCH-ToReleaseList) between one and 64 possible TCI states associated with the CORESET. If the CORESET ID is equal to 0, the CORESET may not be configured by an information element ControlResourceSet. Hence, the RRC message 205 may not include a list of possible TCI states associated with CORESET 0. Instead, CORESET 0 may be configured (e.g., automatically, by default) with the first 64 TCI states of the total 128 possible TCI states.

The RRC message 205 may optionally include an indication of a mapping scheme to employ for the CORESET. That is, if more than one TCI state of the CORESET is activated (e.g., for a PDCCH transmission 215), the resources for each of the activated TCI states may be mapped according to a mapping scheme. For example, the RRC message 205 may indicate that, if more than one TCI state of the CORESET is activated, the resources for the more than one TCI state may be mapped according to an FDM scheme, a TDM scheme, or a spatial division multiplexing (SDM) scheme. If the RRC message 205 includes the indication of the mapping scheme, the RRC message 205 may additionally include parameters for the mapping scheme.

Base station 105-a may communicate MAC-CE 210 to UE 115-a. The MAC-CE 210 may be a control message from the base station 105-a configured to indicate one or more activated TCI states for the CORESET (e.g., the CORESET configured by the RRC message 205). In some cases, the MAC-CE 210 may activate TCI states for a group of CCs or BWPs. The MAC-CE 210 may include a field identifying the CORESET (e.g., a CORESET ID field). The MAC-CE 210 may also include a field identifying at least one TCI state to be activated (e.g., for a subsequent PDCCH transmission 215). In some cases, the CORESET containing the PDCCH transmission 215 may only be configured to include a single activated TCI state. Here, the MAC-CE 210 may indicate the one activated TCI state for the subsequent PDCCH transmission 215. In some other cases (e.g., in the case of the wireless communications system 200), the CORESET containing the PDCCH transmission 215 may be configured to include one or more activated TCI states (e.g., one activated TCI state, two activated TCI states). That is, the CORESET containing the PDCCH transmission 215 may be dynamically configurable to include either one or multiple activated TCI states. Here, the MAC-CE 210 may indicate which TCI states (e.g., of the TCI states associated with the CORESET) are activated for the PDCCH transmission 215.

The MAC-CE 210 may optionally include an indication of a mapping scheme to employ for the CORESET if more than one TCI state is activated. That is, if the RRC message 205 does not include the indication of the mapping scheme, the MAC-CE 210 may include the indication of the mapping scheme. For example, the MAC-CE 210 may indicate that if more than one TCI state of the CORESET is activated (e.g., for a PDCCH transmission 215), the resources for each of the activated TCI states may be mapped according to a mapping scheme (e.g., an FDM scheme, a TDM scheme, an SDM scheme). If the MAC-CE 210 includes the indication of the mapping scheme, the MAC-CE 210 may additionally include parameters for the mapping scheme.

Base station 105-a may communicate a PDCCH transmission 215 to UE 115-a. The base station 105-a may communicate the PDCCH transmission 215 within the CORESET configured by the RRC message 205. Additionally, the base station 105-a may use the one or more activated TCI states indicated within the MAC-CE 210 to transmit the PDCCH transmission 215. The UE 115-a may receive the PDCCH transmission 215 and decode the PDCCH transmission 215 using the same one or more activated TCI states.

The PDCCH transmission 215 may include scheduling information for a subsequent PDSCH transmission 220. For example, the PDCCH transmission 215 may include a scheduling offset indicating the PDSCH transmission 220. Additionally, the PDCCH transmission 215 may include downlink control information (DCI) indicating one or more activated TCI states for the PDSCH transmission 220. In some cases, the base station 105-a and UE 115-a may use the TCI states indicated within the DCI for the PDSCH transmission 220. In some other cases, the base station 105-a and UE 115-a may determine which TCI states to use for the PDSCH transmission 220 by another method.

In one example, the PDCCH transmission 215 may fail to include a field indicating one or more activated TCI states for the PDSCH transmission 220. Here, the UE 115-a and base station 105-a may determine the TCI states associated with the PDSCH transmission 220 from one or more of the activated TCI states associated with the PDCCH transmission 215. That is, the UE 115-a and base station 105-a may use the one or more TCI states activated for the PDCCH transmission 215 to receive and transmit the PDSCH transmission 220. If there are more than one TCI state activated for the PDCCH transmission 215, one of the activated TCI states may be used for the PDSCH transmission 220 or all of the activated TCI states may be used for the PDSCH transmission 220. If all of the activated TCI states are used for the PDSCH transmission 220, the multiplexing techniques used for the PDCCH transmission 215 may be reused for the PDSCH transmission 220. For example, if the base station 105-a transmits the PDCCH transmission 215 using two activated TCI states mapped using a TDM scheme, the base station 105-a may transmit the PDSCH transmission 220 using the same two activated TCI states and mapped using the same TDM scheme.

If only one of the activated TCI states is to be used for the PDSCH transmission 220, the UE 115-a and base station 105-a may determine which of the more than one activated TCI states to use for the PDSCH transmission 220. For example, the UE 115-a and base station 105-a may select the TCI state (e.g., from the activated TCI states for the CORESET that carries the PDCCH transmission 215) associated with a lowest TCI state ID. That is, the UE 115-a and base station 105-a may compare the TCI state IDs of each of the activated TCI states of the CORESET that carries the PDCCH to determine which TCI state is associated with the lowest TCI state. In another example, the UE 115-a and base station 105-a select the TCI state from the activated TCI states of the CORESET that carries the PDCCH transmission 215 based on an order of the fields within the MAC-CE 210. That is, the UE 115-a and base station 105-a may select the TCI state that was indicated first within the MAC-CE 210. Alternatively, the UE 115-a and the base station 105-a may select the TCI state that was indicated last within the MAC-CE 210.

In another example, the UE 115-a and base station 105-a may determine which TCI states to use for the PDSCH transmission 220 (e.g., as opposed to using TCI states indicated within the PDCCH transmission 215) because the indicated scheduling offset is less than a time duration for QCL (e.g., a timeDurationForQCL). Here, the UE 115-a and base station 105-a may determine the activated TCI states associated with the PDSCH transmission 220 based on a default QCL assumption for the PDSCH transmission 220. The default QCL assumption may be a QCL relationship or TCI state of the CORESET associated with a monitored search space with a lowest CORESET ID in the latest slot in which one or more CORESETs within the active BWP of the base station 105-a are monitored by the UE 115-a. If there is more than one TCI state activated for the CORESET with the lowest CORESET ID associated with the latest slot, one of the activated TCI states may be used for the PDSCH transmission 220 or all of the activated TCI states may be used for the PDSCH transmission 220. If all of the activated TCI states are used for the PDSCH transmission 220, the multiplexing techniques used for the latest slot may be reused for the PDSCH transmission 220. For example, if the base station 105-a transmits a PDCCH transmission 215 using a CORESET with the lowest CORESET ID within the latest slot using two activated TCI states mapped by an SDM scheme, the base station 105-a may transmit the PDSCH transmission 220 using the same two activated TCI states and mapped using the same SDM scheme.

If only one of the activated TCI states is to be used for the PDSCH transmission 220, the UE 115-a and base station 105-a may determine which of the more than one activated TCI states to use for the PDSCH transmission 220. For example, the UE 115-a and base station 105-a may select the TCI state (e.g., from the activated TCI states used for the CORESET) associated with a lowest TCI state ID. That is, the UE 115-a and base station 105-a may compare the TCI state IDs of each of the activated TCI states to determine which TCI state is associated with the lowest TCI state. In another example, the UE 115-a and base station 105-a select the TCI state from the activated TCI states used for the CORESET based on an order of the fields within the MAC-CE 210. That is, the UE 115-a and base station 105-a may select the TCI state that was indicated first within the MAC-CE 210. Alternatively, the UE 115-a and the base station 105-a may select the TCI state that was indicated last within the MAC-CE 210.

In another example, the UE 115-a may determine to exclude all CORESETs associated with more than one activated TCI state. In such example, the default QCL assumption may be a QCL relationship or TCI state of the CORESET associated with a monitored search space with a lowest CORESET ID of a remaining set of CORESETs (e.g., CORESETs that were not excluded) in the latest slot in which one or more CORESETs within the active BWP of the base station 105-a are monitored by the UE 115-a That is, the UE 115-a may identify a CORESET with one activated TCI state and select the one activated TCI state to be used for the PDSCH transmission 220, Base station 105-a may communicate a PDSCH transmission 220 to UE 115-a. The base station 105-a may transmit the PDSCH transmission 220 using one or more activated TCI states and the UE 115-a may receive and decode the PDSCH transmission 220 using the same one or more activated TCI states.

FIG. 3 illustrates an example of configurations 300 of MAC-CEs 210 that supports signaling for configuring downlink transmissions in accordance with aspects of the present disclosure. In some examples, configurations 300 may implement aspects of wireless communications system 100 and 200 such as MAC-CEs 210, which may be examples of the MAC-CE 210 as described with reference to FIG. 2. Additionally, the MAC-CEs 210 may be transmitted from a base station 105 to a UE 115 as described with reference to FIGS. 1 and 2 to activate one or more TCI states. Each of the MAC-CEs 210 may be configured to indicate one or more activated TCI states (e.g., for a PDCCH transmission). That is, each of the MAC-CEs 210 may indicate a single activated TCI state or more than one activated TCI state. The configurations 300 may be utilized for all CORESETs. Alternatively, the configurations 300 may be utilized for a subset of CORESETs configured to use one or more TCI states. That is, CORESETs that are configured to use only a single TCI state may utilize a different configuration for MAC-CEs 210 activating the single TCI state.

Figure 3A:
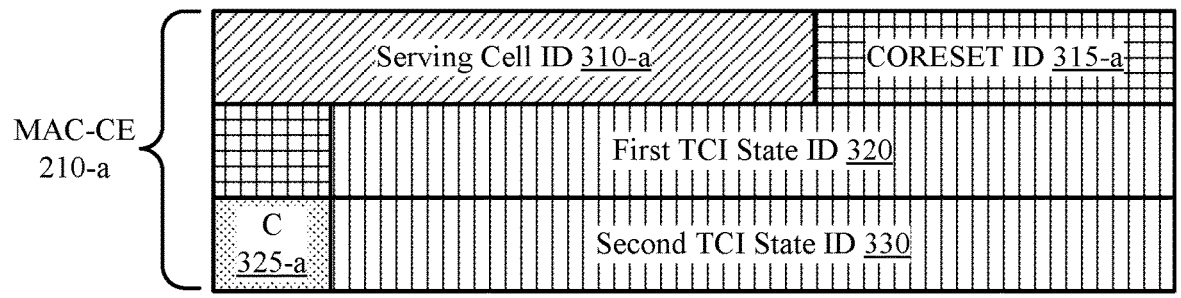
FIGS. 3A and 3B illustrate examples of configurations that support signaling for configuring downlink transmissions in accordance with aspects of the present disclosure.

FIG. 3A illustrates a configuration 300-a of the MAC-CE 210-a. The configuration 300-a may correspond to a MAC-CE 210-a that has a static size. That is, a quantity of bits included within the MAC-CE 210-a may be independent of a quantity of activated TCI states. For example, the MAC-CE 210-a may include 24 bits regardless of a quantity of activated TCI states.

The MAC-CE 210-a may include a serving cell ID field 310-a. In some cases, the serving cell ID field 310-a may include five bits of data. The serving cell ID field 310-a may indicate an ID of the CC (or, in some cases, group of CCs) for which the CORESET belongs to. The MAC-CE 210-a may further include a CORESET ID field 315-a. The CORESET ID field 315-a may include four bits of data (e.g., three bits of data on the first line and one bit of data on the second line of the MAC-CE 210-a). The MAC-CE 210-a may include a first TCI state ID field 320 and a second TCI state ID field 330. Each of the TCI state ID fields 320 and 330 may include seven bits. That is, the TCI state ID may identify the TCI state from 128 possible TCI states. The MAC-CE 210-a may also include an indicator bit 'C' 325-a. The indicator bit 'C' 325-a may indicate whether the second TCI state ID field 330 includes a TCI state ID corresponding to an activated TCI state. For example, if the indicator bit 'C' 325-a includes a logic value '0', the second TCI state ID field 330 may not include an ID associated with an activated TCI state. That is, the MAC-CE 210-a may only activate a single TCI state (e.g., indicated by the first TCI state ID field 320). Additionally, if the indicator bit 'C' 325-a includes a logic value '1', the second TCI state ID field 330 may include an ID associate with an activated TCI state. That is, the MAC-CE 210-a may activate two TCI states (e.g., indicated by the first TCI state ID field 320 and the second TCI state ID field 330).

Figure 3B:
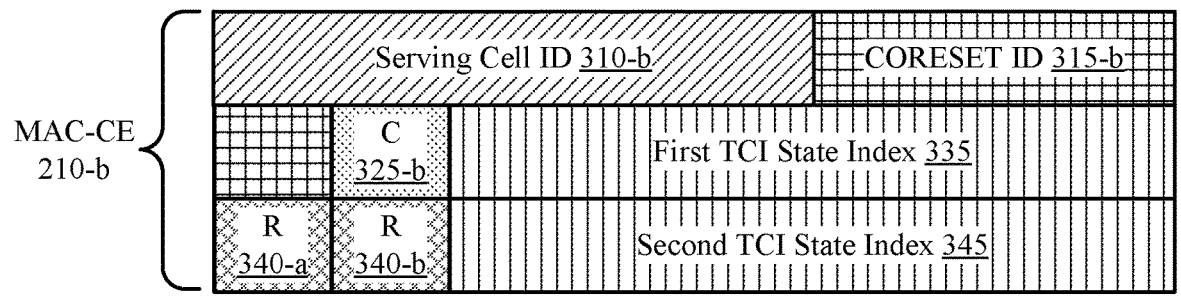

FIG. 3B illustrates a configuration 300-b of the MAC-CE 210-b. The configuration 300-b may correspond to a MAC-CE 210-b that has a dynamic size. That is, a quantity of bits included within the MAC-CE 210-b may be dependent of a quantity of activated TCI states. That is, the MAC-CE 210-b may change in size based on a quantity of activated TCI states. For example, the MAC-CE 210-b may include 24 bits if two TCI states are activated. Additionally, the MAC-CE 210-b may include 16 bits if one TCI state is activated.

The MAC-CE 210-b may include a serving cell ID field 310-b. In some cases, the serving cell ID field 310-b may include five bits of data. The serving cell ID field 310-b may indicate an ID of the CC (or, in some cases, group of CCs) for which the CORESET belongs to. The MAC-CE 210-b may further include a CORESET ID field 315-b. The CORESET ID field 315-b may include four bits of data (e.g., three bits of data on the first line and one bit of data on the second line of the MAC-CE 210-a). The MAC-CE 210-b may also include a first TCI state index field 335 and an optional second TCI state index field 345. Each TCI state index field 335 and 345 may include six bits. Thus, the TCI state index fields 335 and 345 may index the TCI states from the TCI states defined in association with the CORESET (e.g., by an RRC message or configuration message). If 64 or less TCI states are defined in association with the CORESET, the six bit TCI state index fields 335 and 345 may identify an index associated with one of the defined TCI states. The indicator bit 'C' 325-b may indicate a quantity of activated TCI states. For example, if the indicator bit 'C' 325-b includes a logic value '0', there may only be a single activated TCI state for the CORESET indicated by the CORESET ID field 315-b. Here, the reserved bits 'R' 340 and the second TCI state index field 345 may not be included within the MAC-CE 210-b. Additionally, if the indicator bit 'C' 325-b includes a logic value '1', there may be two activated TCI states. Here, the reserved bits 'R' 340-a and 340-b may be logic value '0s' and the second TCI state index field 345 may indicate which TCI state (e.g., from the list of TCI states defined for the CORESET) is activated.

Figure 4:
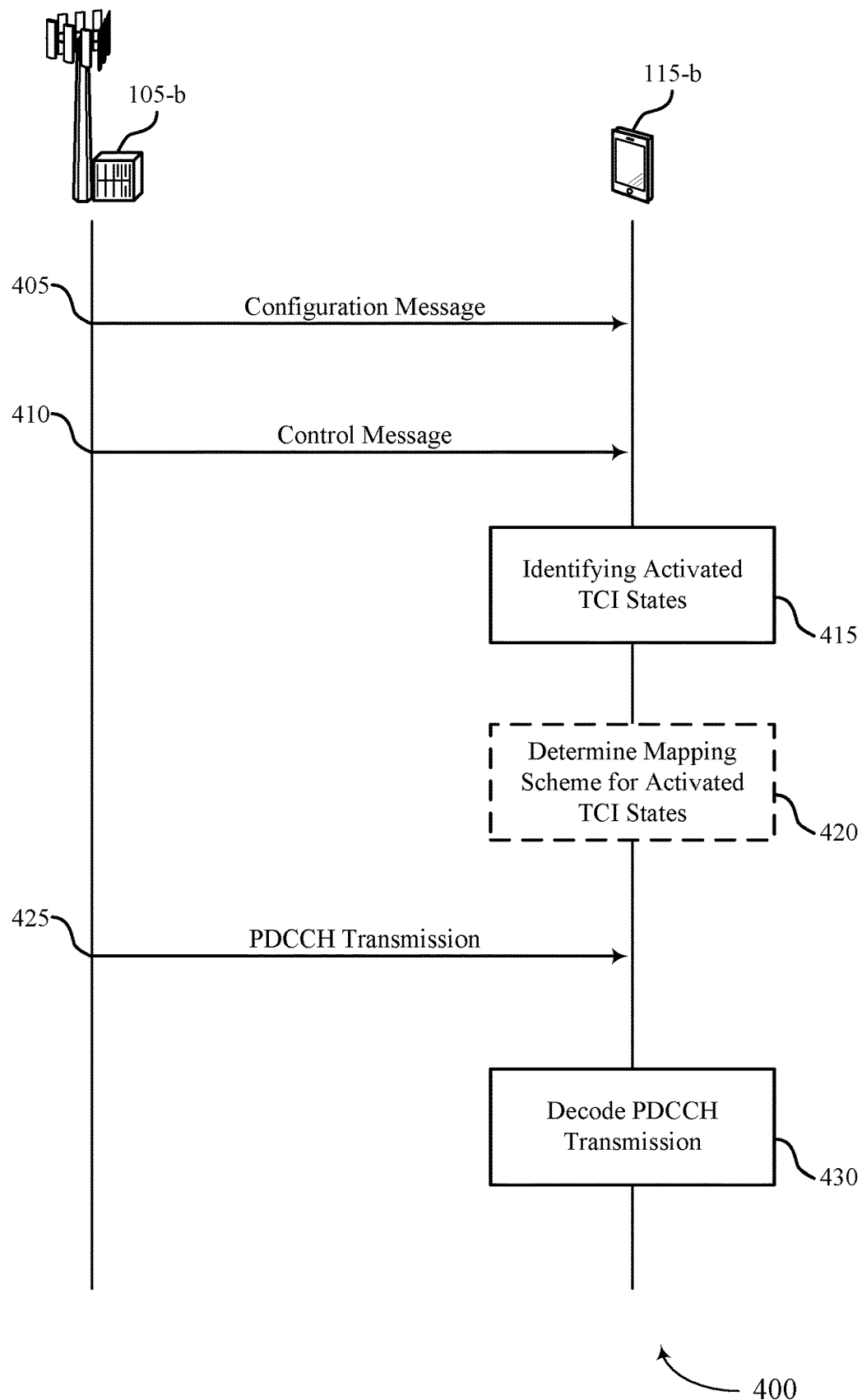
FIGS. 4 and 5 illustrate example process flows that support signaling for configuring downlink transmissions in accordance with aspects of the present disclosure.

FIG. 4 illustrates an example of a process flow 400 that supports signaling for configuring downlink transmissions in accordance with aspects of the present disclosure. In some examples, the process flow 400 may implement aspects of FIGS. 1 through 3. For example, the process flow 400 may include signaling between a UE 115-b and a base station 105-b, which may be examples of UEs 115 and base stations 105 as described with reference to FIGS. 1 and 2. Additionally, some of the signaling may implement a configuration as described with reference to FIG. 3.

At 405, the base station 105-b may transmit a configuration message to the UE 115-b. The configuration message may be an example of an RRC message as described with reference to FIGS. 1 and 2. The configuration message 405 may indicate that a CORESET for a downlink control channel (e.g., a PDCCH) is associated with a set of TCI states. For example, the configuration message 405 may define up to 64 TCI states for the CORESET.

At 410, the base station 105-b may transmit a control message to the UE 115-b. The control message may be an example of a MAC-CE as described with reference to FIGS. 1 through 3. For example, the control message may be configured according to one of the configurations as described with reference to FIG. 3A or 3B. The control message may activate one or more TCI states for the CORESET.

At 415, the UE 115-b may identify the activated TCI states 415. In a first example, the UE 115-b may determine that a single TCI state is activate for the CORESET. That is, the control message may include an indication (e.g., an indicator bit 'C') that a single TCI state is activated. In another example, the UE 115-b may determine that two TCI states are activated for the CORESET. That is, the control message may include an indication (e.g., an indicator bit 'C') that two TCI states are activated.

The UE 115-b may identify which TCI states are activated based on the control message. That is, the control message may include a TCI state ID within the control message. Additionally, the control message may include a TCI state index within the control message (e.g., relating to the set of TCI states associated with the CORESET).

At 420, the UE 115-b may optionally determine a mapping scheme for the activated TCI states. That is, if the UE 115-b identifies more than one activated TCI state (e.g., at 415), the UE 115-b may determine a mapping scheme for the more than one activated TCI state at 420. That is, the UE 115-b may determine that the TCI states may be mapped by TDM, FDM, or SDM. In some cases, the configuration message 405 may indicate one or more of the mapping schemes for the CORESET as well as parameters for the mapping scheme. The control message may indicate one of the mapping schemes for the CORESET. Thus, the UE 115-b may determine the mapping scheme.

At 425, the base station 105-b may transmit a PDCCH transmission (e.g., a downlink control channel transmission) to the UE 115-b according to the configuration message and control message. That is, the base station 105-b may transmit the PDCCH transmission using the one or more activated TCI states indicated by the control message.

At 430, the UE 115-b may decode the PDCCH transmission based on the configuration message and the one or more activated TCI states (e.g., using the one or more activated TCI states indicated by the control message).

Figure 5:
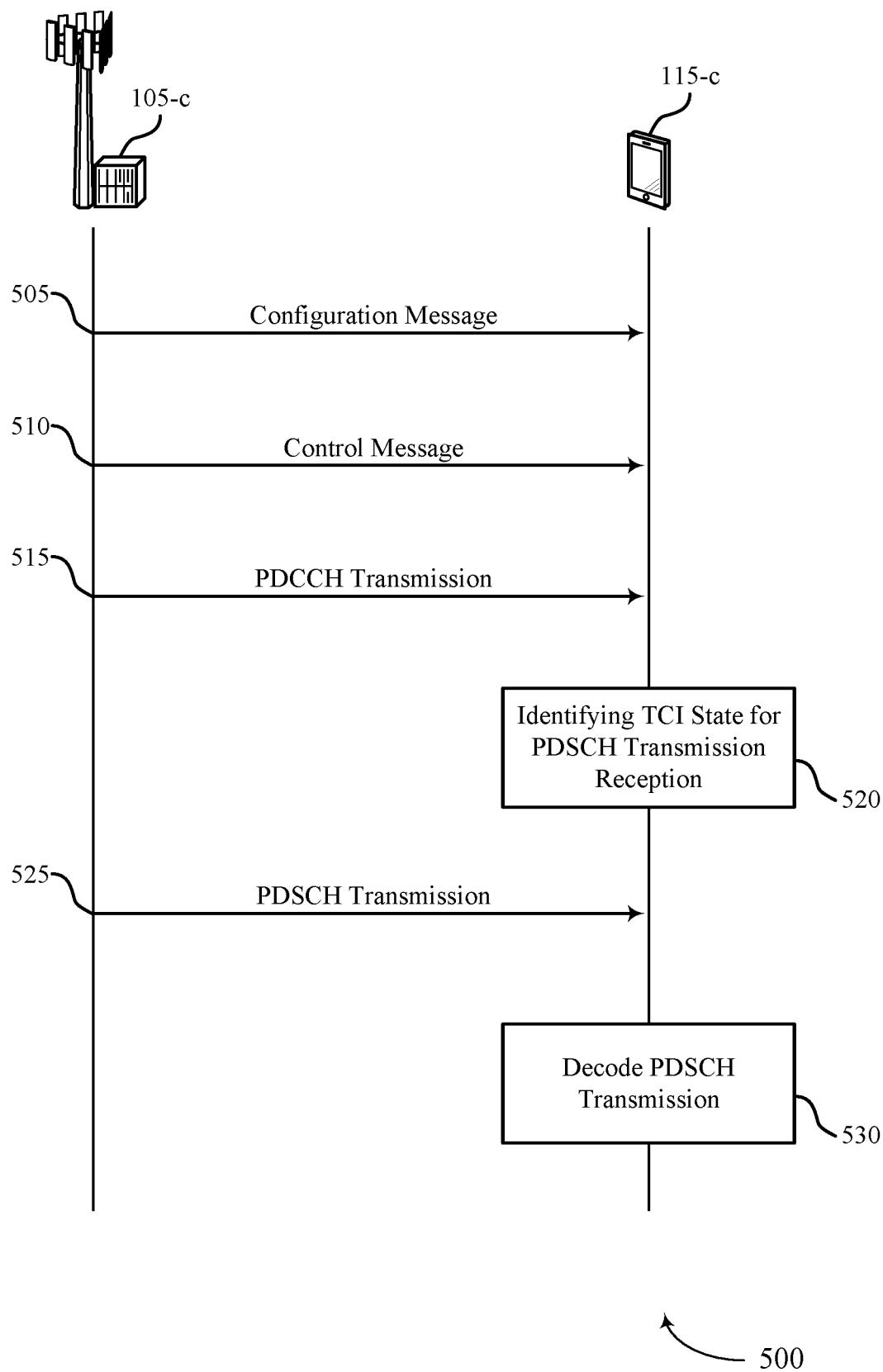

FIG. 5 illustrates an example of a process flow 500 that supports signaling for configuring downlink transmissions in accordance with aspects of the present disclosure. In some examples, the process flow 500 may implement aspects of FIGS. 1 through 3. For example, the process flow 500 may include signaling between a UE 115-c and a base station 105-c, which may be examples of UEs 115 and base stations 105 as described with reference to FIGS. 1 and 2. Additionally, some of the signaling may implement a configuration as described with reference to FIG. 3.

At 505, the base station 105-c may transmit a configuration message to the UE 115-c. The configuration message may be an example of an RRC message as described with reference to FIGS. 1 and 2. The configuration message 505 may indicate that a CORESET for a downlink control channel (e.g., a PDCCH) is associated with a set of TCI states. For example, the configuration message 505 may define up to 64 TCI states for the CORESET.

At 510, the base station 105-c may transmit a control message to the UE 115-c. The control message may be an example of a MAC-CE as described with reference to FIGS. 1 through 3. For example, the control message may be configured according to one of the configurations as described with reference to FIG. 3A or 3B. The control message may activate one or more TCI states for the CORESET.

At 515, the base station 105-c may transmit a PDCCH transmission to the UE 115-c in accordance with the configuration message and control message (e.g., using the one or more activated TCI states indicated by the control message 510). The PDCCH transmission may schedule a PDSCH transmission and include scheduling information for the PDSCH transmission. For example, the PDCCH transmission may include a scheduling offset for the PDSCH transmission.

At 520, the UE 115-c may identify at least one TCI state to apply to a reception of the PDSCH transmission. In a first example, the UE 115-c may identify the at least one TCI state based on an absence of a TCI field included in the scheduling information that indicates a TCI state for the PDSCH transmission. Here, the scheduling offset for the PDSCH transmission may be greater than a threshold scheduling offset (e.g., a time duration for QCL). In this first example, the UE 115-c may determine to apply a TCI state to the reception of the PDSCH transmission from one or more TCI states activated for the CORESET that carries PDCCH transmission (e.g., for the reception of the PDCCH transmission).

In a second example, the UE 115-c may identify the at least one TCI state based on the scheduling offset for the PDSCH transmission being less than the threshold scheduling offset. Here, the UE 115-c may identify one or more CORESETs associated with a transmission received prior to 520. The UE 115-c may then determine a CORESET associated with a lowest value of a CORESET ID from each of the CORESET IDs of the one or more CORESETs. The UE 115-c may determine to apply one or more of the TCI states associated with the CORESET (e.g., associated with lowest value of the CORESET ID) to the reception of the PDSCH.

In either example, the UE 115-c may, in some cases, determine to apply all (e.g., both) of the one or more TCI states (e.g., two TCI states) to the reception of the PDSCH. In another case, the UE 115-c may determine to apply one of the two TCI states to the reception of the PDSCH. Here, the UE 115-c may identify one of the one or more activated TCI states based on a relative value of a TCI state ID for each of the two activated TCI states or a relative position of two fields within the control message each indicating one of the two activated TCI states.

In some examples, the UE 115-c may determine a subset of the one or more CORESET that excludes CORESETS associated with more than one active TCI state. In such example, UE 115-c may determine a CORESET associated with the lowest CORESET ID from each of the CORESETs of the subset of CORESETS and apply the one TCI state associated with the determined CORESET to the reception of the PDSCH.

At 525, the base station 105-c may transmit, to the UE 115-c, the PDSCH transmission using the identified TCI states.

At 530, the UE 115-c may decode the PDSCH transmission by applying the identified TCI states to the reception of the PDSCH transmission.

Figure 6:
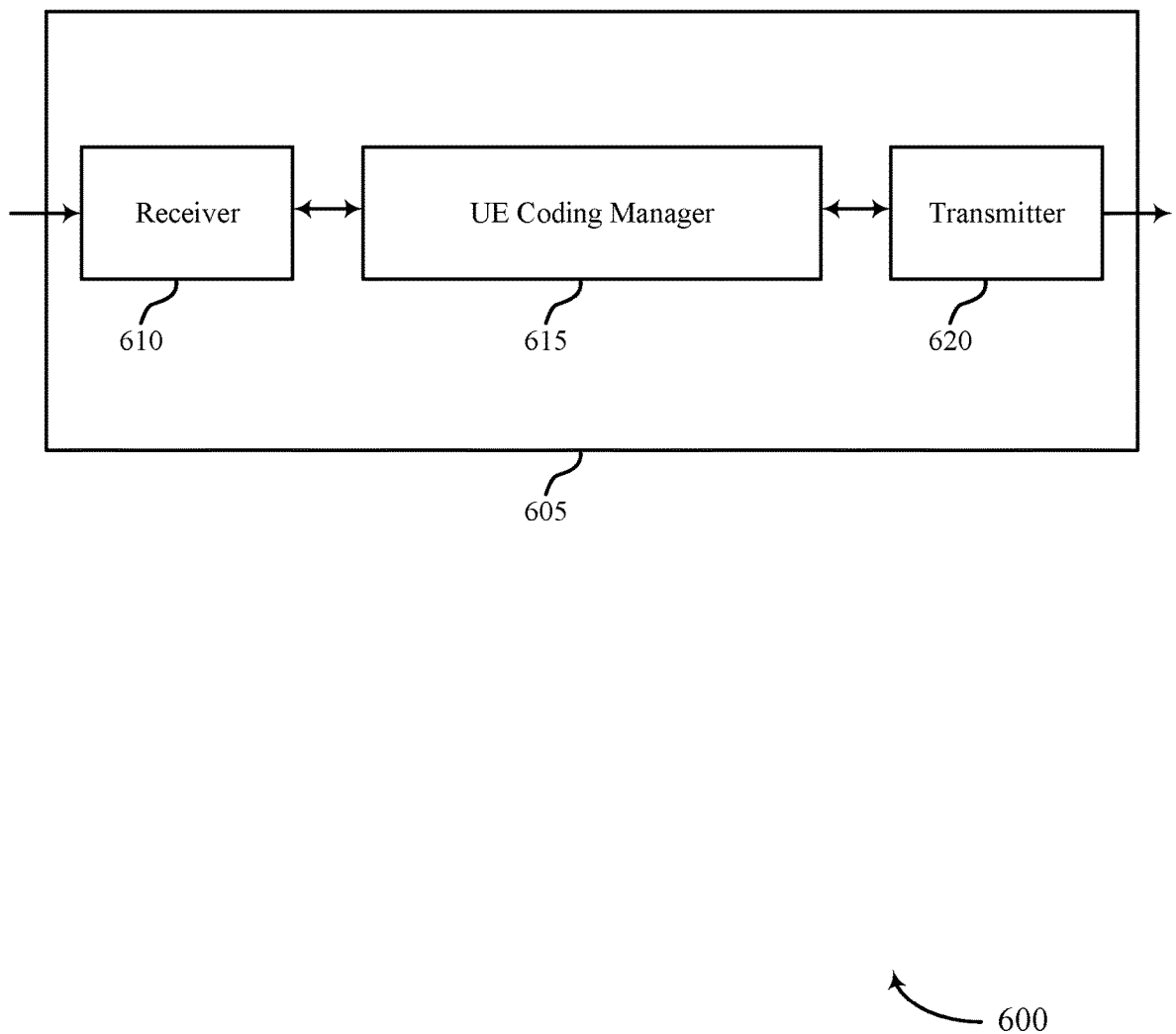
FIGS. 6 and 7 show block diagrams of devices that support signaling for configuring downlink transmissions in accordance with aspects of the present disclosure.

FIG. 6 shows a block diagram 600 of a device 605 that supports signaling for configuring downlink transmissions in accordance with aspects of the present disclosure. The device 605 may be an example of aspects of a UE 115 as described herein. The device 605 may include a receiver 610, a UE coding manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to signaling for configuring downlink transmissions). Information may be passed on to other components of the device 605. The receiver 610 may be an example of aspects of the transceiver 920 described with reference to FIG. 9. The receiver 610 may utilize a single antenna or a set of antennas.

The UE coding manager 615 may identify that a CORESET for a downlink control channel is associated with a set of TCI states, receive, from a base station, a control message activating one or more TCI states for the CORESET, and decode the downlink control channel based on the one or more activated TCI states.

Additionally, the UE coding manager 615 may receive, from a base station, a configuration message indicating that a CORESET is associated with a set of activated TCI states, receive a physical downlink control transmission over the CORESET in accordance with the configuration message, the physical downlink control transmission including scheduling information for a PDSCH transmission, identify, based on an absence of a TCI field included in the scheduling information that indicates a TCI state for the PDSCH transmission, at least one TCI state of the set of activated TCI states to apply to a reception of the PDSCH transmission, and decode the PDSCH transmission in accordance with the at least one TCI state.

Additionally, the UE coding manager 615 may receive, from a base station, a configuration message indicating that a CORESET is associated with a set of activated TCI states, receive a physical downlink control transmission, the physical downlink control transmission including scheduling information for a PDSCH transmission, identify, based on a scheduling offset for the PDSCH transmission being less than a threshold scheduling offset, at least one TCI state of the set of activated TCI states to apply to a reception of the PDSCH transmission, and decode the PDSCH transmission in accordance with the at least one TCI state.

The UE coding manager 615 may be an example of aspects of the UE coding manager 910 described herein. The UE coding manager 615, or its sub-components, may be implemented in hardware, code (e.g., software or firmware) executed by a processor, or any combination thereof. If implemented in code executed by a processor, the functions of the UE coding manager 615, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The actions performed by the coding manager 615 as described herein may be implemented to realize one or more potential advantages. For example, allowing the device 605 (e.g., a UE 115) to utilize one or more TCI states as opposed to only one TCI state may potentially increase the diversity of transmissions as well as increase reliability of the transmissions. Increasing reliability my in turn decrease processing at the device 605. That is, less processing power may be expended by the device 605 due to a decrease in retransmission operations.

The UE coding manager 615, or its sub-components, may be physically located at various positions, including being distributed such that portions of functions are implemented at different physical locations by one or more physical components. In some examples, the UE coding manager 615, or its sub-components, may be a separate and distinct component in accordance with various aspects of the present disclosure. In some examples, the UE coding manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
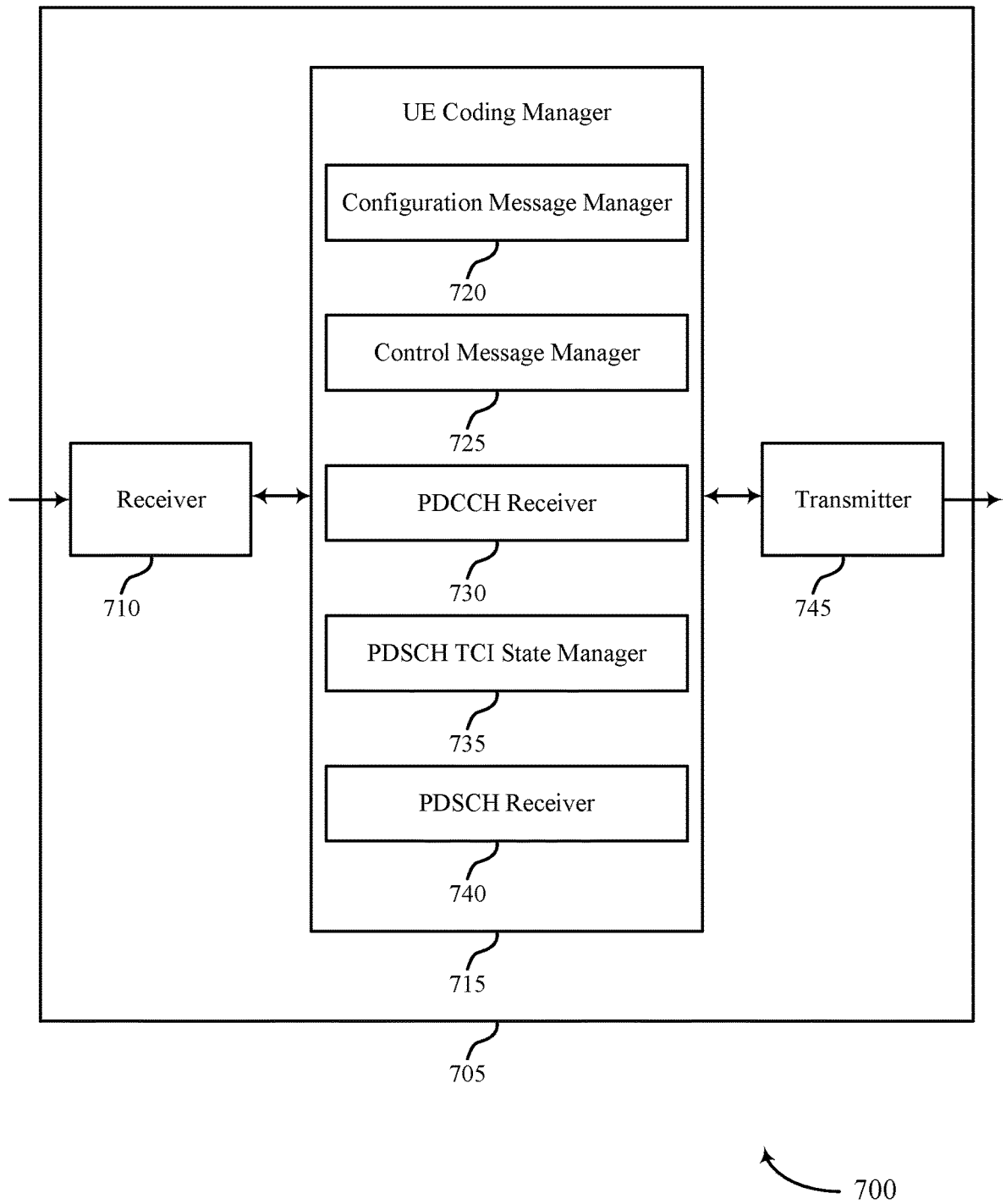

FIG. 7 shows a block diagram 700 of a device 705 that supports signaling for configuring downlink transmissions in accordance with aspects of the present disclosure. The device 705 may be an example of aspects of a device 605, or a UE 115 as described herein. The device 705 may include a receiver 710, a UE coding manager 715, and a transmitter 745. The device 705 may also include a processor. Each of these components may be in communication with one another (e.g., via one or more buses).

The receiver 710 may receive information such as packets, user data, or control information associated with various information channels (e.g., control channels, data channels, and information related to signaling for configuring downlink transmissions). Information may be passed on to other components of the device 705. The receiver 710 may be an example of aspects of the transceiver 920 described with reference to FIG. 9. The receiver 710 may utilize a single antenna or a set of antennas.

The UE coding manager 715 may be an example of aspects of the UE coding manager 615 as described herein. The UE coding manager 715 may include a configuration message manager 720, a control message manager 725, a PDCCH receiver 730, a PDSCH TCI state manager 735, and a PDSCH receiver 740. The UE coding manager 715 may be an example of aspects of the UE coding manager 910 described herein.

The configuration message manager 720 may identify that a CORESET for a downlink control channel is associated with a set of TCI states. Additionally, the configuration message manager 720 may receive, from a base station, a configuration message indicating that a CORESET is associated with a set of activated TCI states.

The control message manager 725 may receive, from a base station, a control message activating one or more TCI states for the CORESET.

The PDCCH receiver 730 may decode the downlink control channel based on the one or more activated TCI states. Additionally, the PDCCH receiver 730 may receive a physical downlink control transmission over the CORESET in accordance with the configuration message, the physical downlink control transmission including scheduling information for a PDSCH transmission. In some cases, the PDCCH receiver 730 may receive a physical downlink control transmission, the physical downlink control transmission including scheduling information for a PDSCH transmission The PDSCH TCI state manager 735 may identify, based on an absence of a TCI field included in the scheduling information that indicates a TCI state for the PDSCH transmission, at least one TCI state of the set of activated TCI states to apply to a reception of the PDSCH transmission. Additionally, the PDSCH TCI state manager 735 may identify, based on a scheduling offset for the PDSCH transmission being less than a threshold scheduling offset, at least one TCI state of the set of activated TCI states to apply to a reception of the PDSCH transmission.

The PDSCH receiver 740 may decode the PDSCH transmission in accordance with the at least one TCI state.

The transmitter 745 may transmit signals generated by other components of the device 705. In some examples, the transmitter 745 may be collocated with a receiver 710 in a transceiver module. For example, the transmitter 745 may be an example of aspects of the transceiver 920 described with reference to FIG. 9. The transmitter 745 may utilize a single antenna or a set of antennas.

Figure 8:
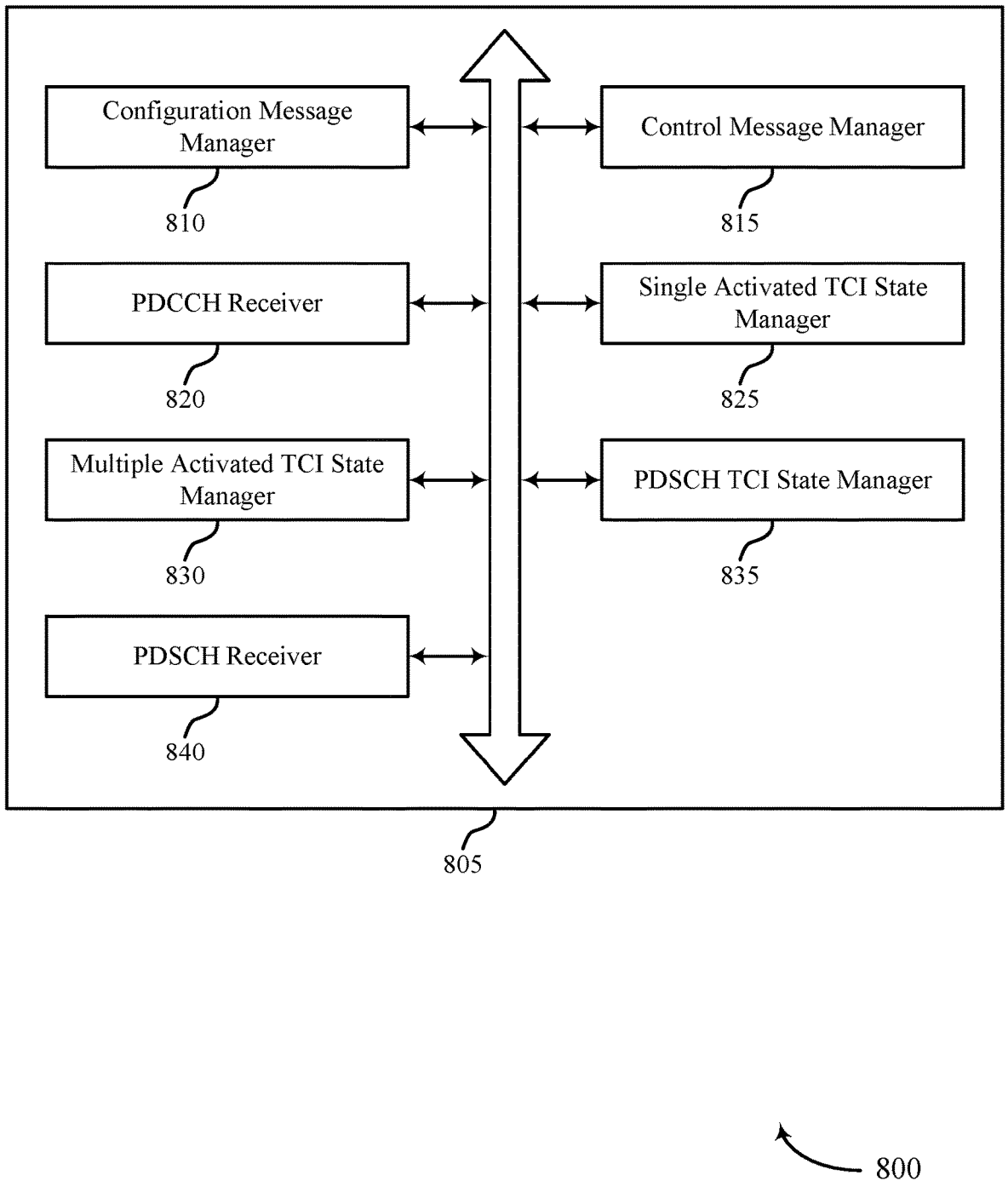
FIG. 8 shows a block diagram of a user equipment (UE) coding manager that supports signaling for configuring downlink transmissions in accordance with aspects of the present disclosure.

FIG. 8 shows a block diagram 800 of a UE coding manager 805 that supports signaling for configuring downlink transmissions in accordance with aspects of the present disclosure. The UE coding manager 805 may be an example of aspects of a UE coding manager 615, a UE coding manager 715, or a UE coding manager 910 described herein. The UE coding manager 805 may include a configuration message manager 810, a control message manager 815, a PDCCH receiver 820, a single activated TCI state manager 825, a multiple activated TCI state manager 830, a PDSCH TCI state manager 835, and a PDSCH receiver 840. Each of these modules may communicate, directly or indirectly, with one another (e.g., via one or more buses).

The configuration message manager 810 may identify that a CORESET for a downlink control channel is associated with a set of TCI states. In some examples, the configuration message manager 810 may receive, from the base station, a configuration message indicating that the CORESET for the downlink control channel is associated with the set of TCI states. In some cases, the configuration message may further indicate that the set of TCI states are mapped using either an FDM mapping, a TDM mapping, or a space division multiplexing mapping. In some instances, the configuration message further indicates parameters for mapping the set of TCI states using at least two of an FDM mapping scheme, a TDM mapping scheme, and a space division multiplexing mapping scheme. In some cases, the configuration message is an RRC message. Additionally, the configuration message manager 810 may receive, from a base station, a configuration message indicating that a CORESET is associated with a set of activated TCI states.

The control message manager 815 may receive, from a base station, a control message activating one or more TCI states for the CORESET. In some examples, receiving the control message may include receiving an indication of the one or more activated TCI states. The indication may include one or more TCI state IDs. Additionally or alternatively, the indication may include one or more indices associated with the one or more activated TCI states. In some cases, the control message includes a first field configured to indicate a first TCI state, a second field configured to indicate a second TCI state, and a third field configured to indicate whether the TCI state of the first TCI state or the first TCI state and the second TCI state are activated. In some cases, the third field is configured to indicate whether the control message includes the second field. In some instances, the control message includes a dynamic number of fields based on a quantity of activated TCI states. In some cases, the control message indicates one of the FDM mapping scheme, the TDM mapping scheme, or the space division multiplexing mapping scheme for mapping of the one or more activated TCI states. In some examples, the control message includes an indication of a group of CCs to which the control message pertains. In some instances, the control message is a MAC-CE. In some cases, the control message manager 815 may receive, from the base station, a control message activating two TCI states for the CORESET, where the at least one TCI state to apply to the reception of the PDSCH transmission includes at least one of the two activated TCI states.

The PDCCH receiver 820 may receive a physical downlink control transmission over the CORESET in accordance with the configuration message, the physical downlink control transmission including scheduling information for a PDSCH transmission.

Alternatively or additionally, the PDCCH receiver 820 may receive a physical downlink control transmission, the physical downlink control transmission including scheduling information for a PDSCH transmission. In some examples, the PDCCH receiver 820 may decode the downlink control channel based on the one or more activated TCI states. In some instances, the PDCCH receiver 820 may decode the physical downlink control transmission based at least in part on the configuration message and at least one of the two activated TCI states.

The single activated TCI state manager 825 may determine, based on an indication within the control message, that a single TCI state is activated for the CORESET. In some examples, identifying a first TCI state that is activated based on the indication, where the one or more activated TCI states includes the first TCI state.

The multiple activated TCI state manager 830 may determine, based on an indication within the control message, that two TCI states are activated for the CORESET. In some examples, the multiple activated TCI state manager 830 may identify a first TCI state that is activated based on the indication. In some cases, identifying a second TCI state that is activated based on the indication, where the one or more activated TCI states includes the first TCI state and the second TCI state.

The PDSCH TCI state manager 835 may identify, based on an absence of a TCI field included in the scheduling information that indicates a TCI state for the PDSCH transmission, at least one TCI state of the set of activated TCI states to apply to a reception of the PDSCH transmission. Additionally or alternatively, the PDSCH TCI state manager 835 may identify, based on a scheduling offset for the PDSCH transmission being less than a threshold scheduling offset, at least one TCI state of the set of activated TCI states to apply to a reception of the PDSCH transmission. In some cases, the identifying is based on a scheduling offset for the PDSCH transmission that is larger than a threshold scheduling offset. In some cases, the threshold scheduling offset is a time duration for QCL.

In some examples, the PDSCH TCI state manager 835 may identify one or more CORESETs associated with a transmission received prior to identifying the CORESET. In some instances, the PDSCH TCI state manager 835 may identify the CORESET associated with two activated TCI states, where the at least one TCI state to apply to the reception of the PDSCH transmission includes at least one of the two activated TCI states. In some cases, the PDSCH TCI state manager 835 may determine that a CORESET ID with a lowest value from each CORESET ID of the one or more CORESETs is the CORESET ID identifying the CORESET. Additionally, PDSCH TCI state manager 835 may identify one or more CORESETs associated with a transmission received prior to decoding the PDSCH transmission. In some cases, the PDSCH TCI state manager 835 may determine a subset of the one or more CORESETs that excludes CORESETs of the one or more CORESETs that are associated with a set of activated TCI states. In some instances, the PDSCH TCI state manager 835 may identify a CORESET from the subset of the one or more CORESETs having a CORESET ID with a value less than each CORESET of other CORESETs from the subset of the one or more CORESETs, where the at least one TCI state to apply to the reception of the PDSCH transmission comprises a TCI state associated with the identified CORESET having the CORESET ID with the value less than each CORESET ID of other CORESETs In some examples, the PDSCH TCI state manager 835 may determine to apply one of the two activated TCI states to the reception of the PDSCH transmission. For example, the PDSCH TCI state manager 835 may determine to apply one of the two activated TCI states to the reception of the PDSCH transmission based on the scheduling information for the PDSCH transmission. In some cases, the PDSCH TCI state manager 835 may identify one of the two activated TCI states to apply to the reception of the PDSCH transmission based on a relative value of a TCI state ID for each of the two activated TCI states or a relative position of two fields within the control message each indicating one of the two activated TCI states.

In some instances, the PDSCH TCI state manager 835 may determine (e.g., based on the scheduling information for the PDSCH transmission) to apply both of the two activated TCI states to the reception of the PDSCH transmission.

The PDSCH receiver 840 may decode the PDSCH transmission in accordance with the at least one TCI state.

Figure 9:
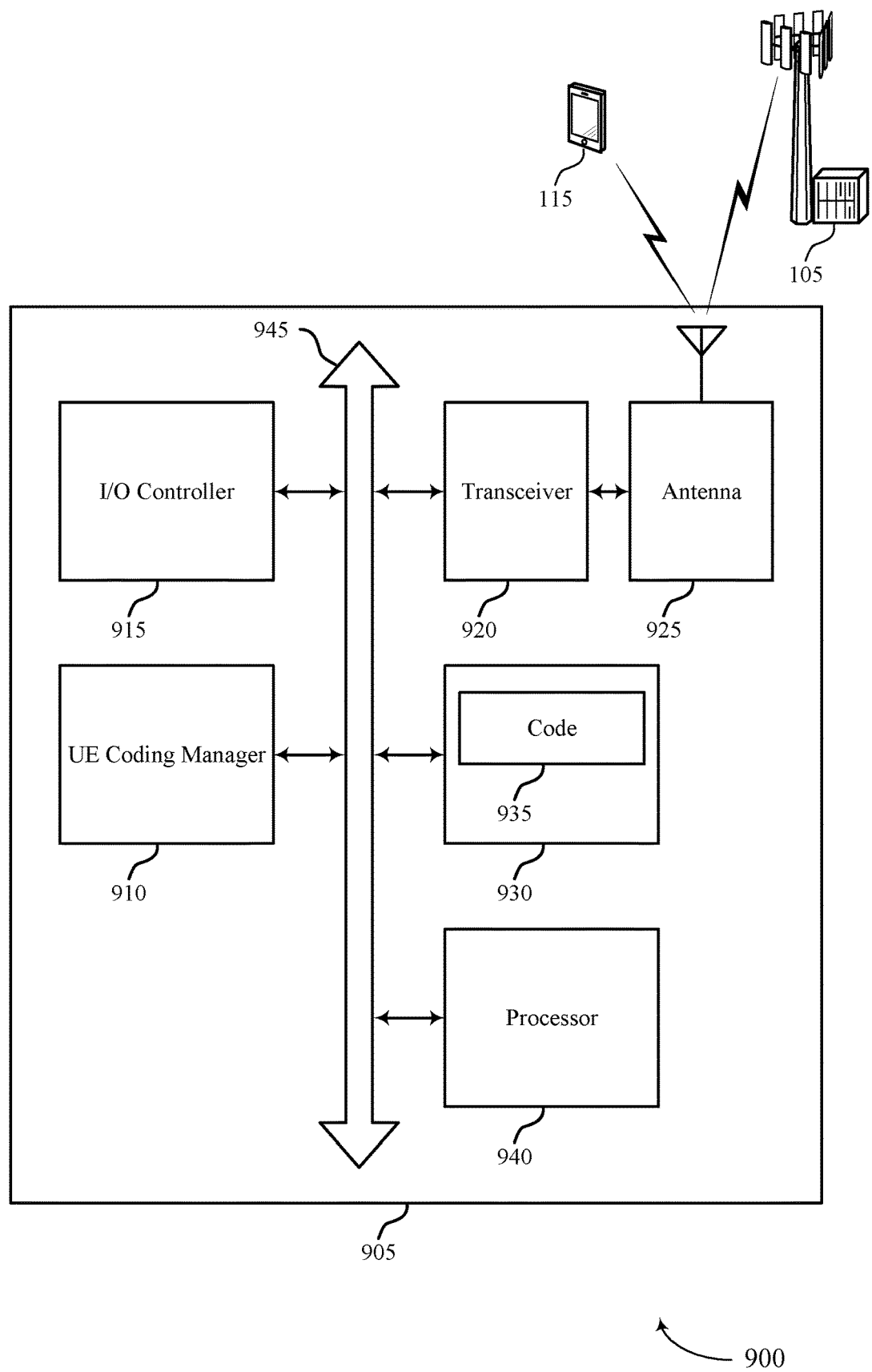
FIG. 9 shows a diagram of a system including a device that supports signaling for configuring downlink transmissions in accordance with aspects of the present disclosure.

FIG. 9 shows a diagram of a system 900 including a device 905 that supports signaling for configuring downlink transmissions in accordance with aspects of the present disclosure. The device 905 may be an example of or include the components of device 605, device 705, or a UE 115 as described herein. The device 905 may include components for bi-directional voice and data communications including components for transmitting and receiving communications, including a UE coding manager 910, an I/O controller 915, a transceiver 920, an antenna 925, memory 930, and a processor 940. These components may be in electronic communication via one or more buses (e.g., bus 945).

The UE coding manager 910 may identify that a CORESET for a downlink control channel is associated with a set of TCI states, receive, from a base station, a control message activating one or more TCI states for the CORESET, and decode the downlink control channel based on the one or more activated TCI states.

Additionally, the UE coding manager 910 may receive, from a base station, a configuration message indicating that a CORESET is associated with a set of activated TCI states, receive a physical downlink control transmission over the CORESET in accordance with the configuration message, the physical downlink control transmission including scheduling information for a PDSCH transmission, identify, based on an absence of a TCI field included in the scheduling information that indicates a TCI state for the PDSCH transmission, at least one TCI state of the set of activated TCI states to apply to a reception of the PDSCH transmission, and decode the PDSCH transmission in accordance with the at least one TCI state.

Additionally, the UE coding manager 910 may receive, from a base station, a configuration message indicating that a CORESET is associated with a set of activated TCI states, receive a physical downlink control transmission, the physical downlink control transmission including scheduling information for a PDSCH transmission, identify, based on a scheduling offset for the PDSCH transmission being less than a threshold scheduling offset, at least one TCI state of the set of activated TCI states to apply to a reception of the PDSCH transmission, and decode the PDSCH transmission in accordance with the at least one TCI state.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include random-access memory (RAM) and read-only memory (ROM). The memory 930 may store computer-readable, computer-executable code 935 including instructions that, when executed, cause the processor to perform various functions described herein. In some cases, the memory 930 may contain, among other things, a basic input/output system (BIOS) which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting signaling for configuring downlink transmissions).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
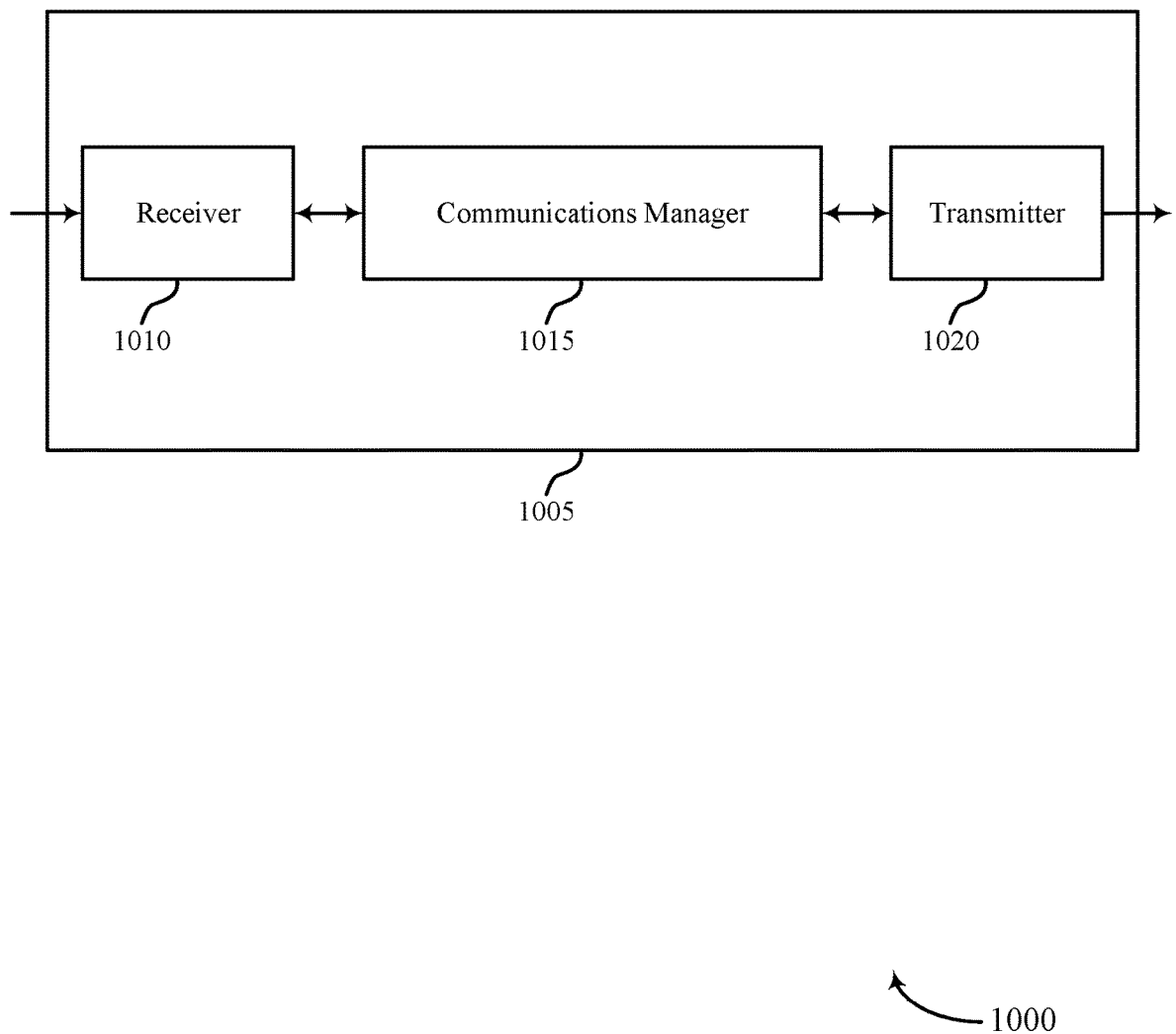
FIGS. 10 and 11 show block diagrams of devices that support signaling for configuring downlink transmissions in accordance with aspects of the present disclosure.

FIG. 10 shows a block diagram 1000 of a device 1005 that supports signaling for configuring downlink transmissions in accordance with aspects of the present disclosure. The device 1005 may be an example of aspects of a base station 105 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to signaling for configuring downlink transmissions). Information may be passed on to other components of the device 1005. The receiver 1010 may be an example of aspects of the transceiver 1320 described with reference to FIG. 13.

The receiver 1010 may utilize a single antenna or a set of antennas.

The communications manager 1015 may identify a configuration indicating that a CORESET for a downlink control channel is associated with a set of TCI states, transmit, to a UE, a configuration message indicating the identified configuration, and transmit, to the UE, a control message activating one or more TCI states for the CORESET.

Additionally, the communications manager 1015 may transmit, to a UE, a configuration message indicating that a CORESET is associated with a set of activated TCI states, transmit, to the UE, a physical downlink control transmission over the CORESET in accordance with the configuration message, the physical downlink control transmission including scheduling information for a PDSCH transmission, identify, based on an absence of a TCI field included in the scheduling information that indicates a TCI state for the PDSCH transmission, at least one TCI state of the set of activated TCI states to apply to a transmission of the PDSCH transmission, and transmit the PDSCH transmission in accordance with the at least one TCI state.

Additionally, the communications manager 1015 may also transmit, to a UE, a configuration message indicating that a CORESET is associated with a set of activated TCI states, transmit, to the UE, a physical downlink control transmission, the physical downlink control transmission including scheduling information for a PDSCH transmission, identify, based on a scheduling offset for the PDSCH transmission being less than a threshold scheduling offset, at least one TCI state of the set of activated TCI states to apply to a transmission of the PDSCH transmission, and transmit the PDSCH transmission in accordance with the at least one TCI state.

The communications manager 1015 may be an example of aspects of the communications manager 1310 described herein. The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
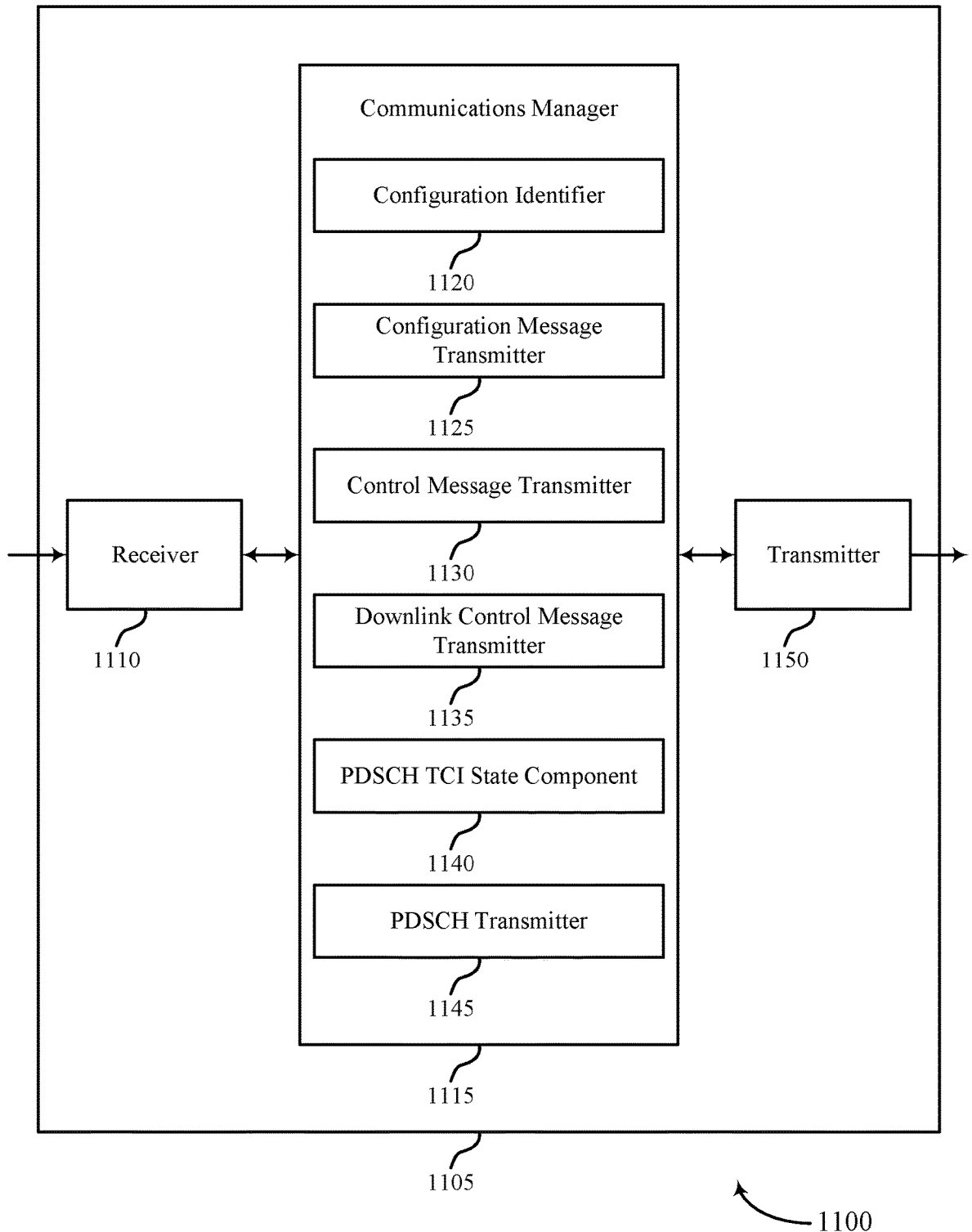

FIG. 11 shows a block diagram 1100 of a device 1105 that supports signaling for configuring downlink transmissions in accordance with aspects of the present disclosure. The device 1105 may be an example of aspects of a device 1005, or a base station 105 as described herein. The device 1105 may include a receiver 1110, a communications manager 1115, and a transmitter 1150. The device 1105 may also include a processor. Each of these components may be in communication with one another (e.g., via one or more buses).

The receiver 1110 may receive information such as packets, user data, or control information associated with various information channels (e.g., control channels, data channels, and information related to signaling for configuring downlink transmissions). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a configuration identifier 1120, a configuration message transmitter 1125, a control message transmitter 1130, a downlink control message transmitter 1135, a PDSCH TCI state component 1140, and a PDSCH transmitter 1145. The communications manager 1115 may be an example of aspects of the communications manager 1310 described herein.

The configuration identifier 1120 may identify a configuration indicating that a CORESET for a downlink control channel is associated with a set of TCI states.

The configuration message transmitter 1125 may transmit, to a UE, a configuration message indicating the identified configuration. Additionally, the configuration message transmitter 1125 may transmit, to a UE, a configuration message indicating that a CORESET is associated with a set of activated TCI states.

The control message transmitter 1130 may transmit, to the UE, a control message activating one or more TCI states for the CORESET.

The downlink control message transmitter 1135 may transmit, to the UE, a physical downlink control transmission over the CORESET in accordance with the configuration message, the physical downlink control transmission including scheduling information for a PDSCH transmission. In some cases, the downlink control message transmitter 1135 may transmit, to the UE, a physical downlink control transmission, the physical downlink control transmission including scheduling information for a PDSCH transmission The PDSCH TCI state component 1140 may identify, based on an absence of a TCI field included in the scheduling information that indicates a TCI state for the PDSCH transmission, at least one TCI state of the set of activated TCI states to apply to a transmission of the PDSCH transmission. Additionally, the PDSCH TCI state component 1140 may identify, based on a scheduling offset for the PDSCH transmission being less than a threshold scheduling offset, at least one TCI state of the set of activated TCI states to apply to a transmission of the PDSCH transmission.

The PDSCH transmitter 1145 may transmit the PDSCH transmission in accordance with the at least one TCI state.

The transmitter 1150 may transmit signals generated by other components of the device 1105. In some examples, the transmitter 1150 may be collocated with a receiver 1110 in a transceiver module. For example, the transmitter 1150 may be an example of aspects of the transceiver 1320 described with reference to FIG. 13. The transmitter 1150 may utilize a single antenna or a set of antennas.

Figure 12:
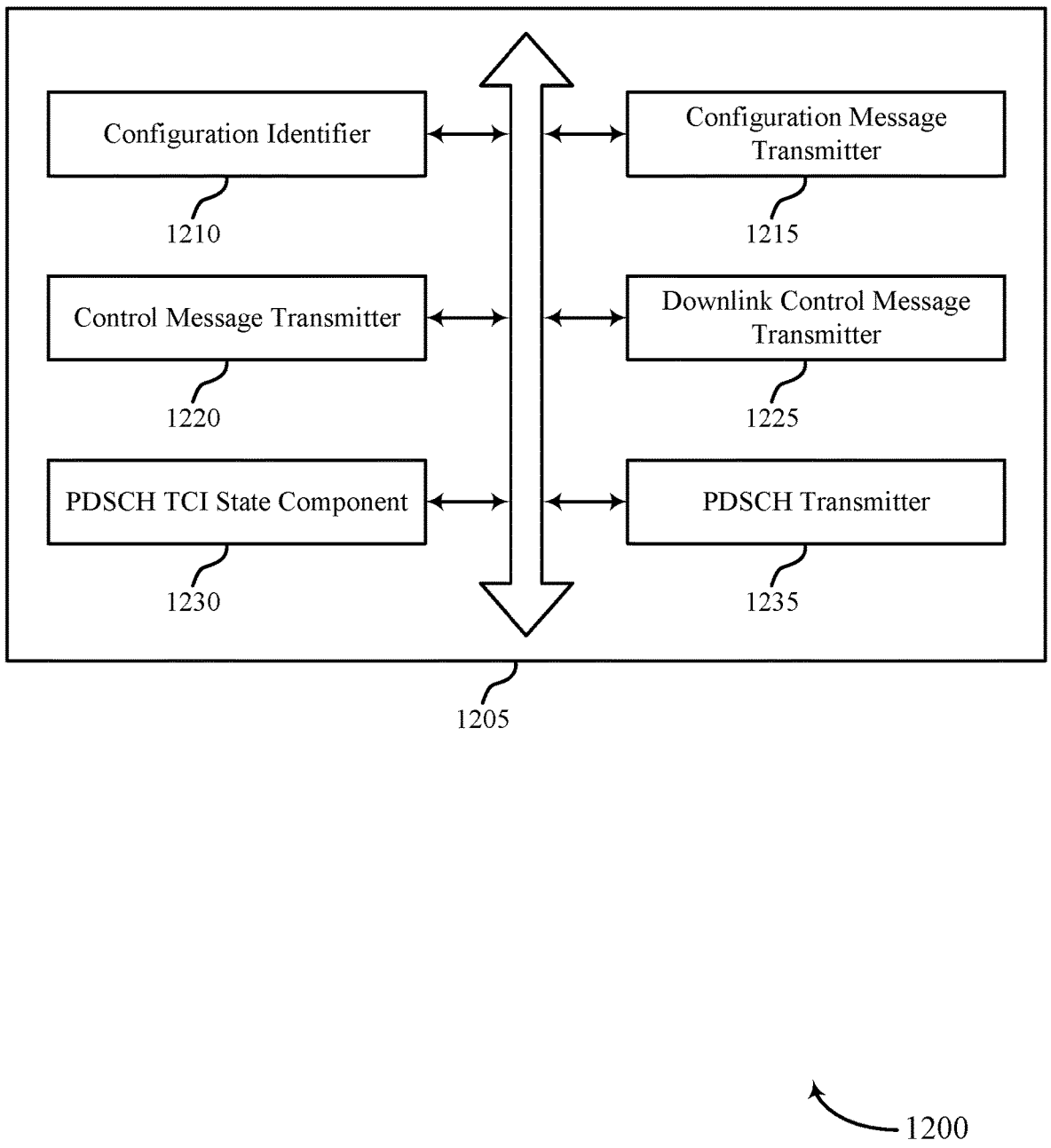
FIG. 12 shows a block diagram of a base station coding manager that supports signaling for configuring downlink transmissions in accordance with aspects of the present disclosure.

FIG. 12 shows a block diagram 1200 of a communications manager 1205 that supports signaling for configuring downlink transmissions in accordance with aspects of the present disclosure. The communications manager 1205 may be an example of aspects of a communications manager 1015, a communications manager 1115, or a communications manager 1310 described herein. The communications manager 1205 may include a configuration identifier 1210, a configuration message transmitter 1215, a control message transmitter 1220, a downlink control message transmitter 1225, a PDSCH TCI state component 1230, and a PDSCH transmitter 1235. Each of these modules may communicate, directly or indirectly, with one another (e.g., via one or more buses).

The configuration identifier 1210 may identify a configuration indicating that a CORESET for a downlink control channel is associated with a set of TCI states.

The configuration message transmitter 1215 may transmit, to a UE, a configuration message indicating the identified configuration. In some examples, the configuration message transmitter 1215 may transmit, to a UE, a configuration message indicating that a CORESET for a downlink control channel is associated with a set of activated TCI states. In some cases, transmitting the configuration message may include transmitting an indication of the one or more activated TCI states. The indication may include a TCI state ID. Additionally, the indication may include one or more indices associated with the one or more activated TCI states. In some cases, the configuration message further indicates that the set of TCI states are mapped using either an FDM mapping, a TDM mapping, or a space division multiplexing mapping. In some instances, the configuration message further indicates parameters for mapping the set of TCI states using at least two of an FDM mapping scheme, a TDM mapping scheme, and a space division multiplexing mapping scheme. In some examples, the configuration message is an RRC message.

The control message transmitter 1220 may transmit, to the UE, a control message activating one or more TCI states for the CORESET. In some examples, the control message transmitter 1220 may transmit, to the UE, a control message activating two TCI states for the CORESET, where the at least one TCI state to apply to the reception of the PDSCH transmission includes at least one of the two activated TCI states. In some cases, the control message includes a first field configured to indicate a first TCI state, a second field configured to indicate a second TCI state, and a third field configured to indicate which TCI state of the first TCI state, the second TCI state, or both TCI states are activated. In some examples, the control message includes a dynamic number of fields based on a quantity of activated TCI states. In some instances, the control message indicates one of the FDM mapping scheme, the TDM mapping scheme, or the space division multiplexing mapping scheme for mapping of the one or more activated TCI states. In some cases, the control message is a MAC-CE.

In some cases, the control message includes an indication that a single TCI state is activated for the CORESET. In some examples, the indication indicates a first TCI state that is activated. In some instances, the one or more activated TCI states include the first TCI state. In some cases, the control message includes an indication that two TCI states are activated for the CORESET. In some examples, the indication indicates that a first TCI state and a second TCI state are activated. In some instances, the one or more activated TCI states include the first TCI state and the second TCI state. In some cases, the control message includes an indication of a group of CCs to which the control message pertains.

The downlink control message transmitter 1225 may transmit, to the UE, a downlink control message via the downlink control channel according to the one or more activated TCI states for the CORESET. In some cases, the downlink control message transmitter 1225 may transmit the physical downlink control transmission based on the configuration message and at least one of the two activated TCI states. In some examples, the downlink control message transmitter 1225 may transmit, to the UE, a physical downlink control transmission over the downlink control channel in accordance with the configuration message, the physical downlink control transmission including scheduling information for a PDSCH transmission. In some cases, the scheduling information for the PDSCH transmission defines a scheduling offset for the PDSCH transmission that is larger than a threshold scheduling offset. In some instances, the threshold scheduling offset is a time duration for QCL.

The PDSCH TCI state component 1230 may identify, based on an absence of a TCI field included in the scheduling information that indicates a TCI state for the PDSCH transmission, at least one TCI state of the set of activated TCI states to apply to a transmission of the PDSCH transmission. Additionally, the PDSCH TCI state component 1230 may identify, based on a scheduling offset for the PDSCH transmission being less than a threshold scheduling offset, at least one TCI state of the set of activated TCI states to apply to a transmission of the PDSCH transmission. In some cases, the threshold scheduling offset is a time duration for QCL. In some examples, the PDSCH TCI state component 1230 may identify the one of the two activated TCI states to apply to the reception of the PDSCH transmission based on a relative value of a TCI state ID for each of the two activated TCI states or a relative position of two fields within the control message each indicating one of the two activated TCI states.

In some examples, the PDSCH TCI state component 1230 may identify one or more CORESETs associated with a transmission transmitted prior to identifying the CORESET. In some cases, identifying the CORESET associated with two activated TCI states, where the at least one TCI state to apply to the reception of the PDSCH transmission includes at least one of the two activated TCI states. In some instances, the PDSCH TCI state component 1230 may determine that a CORESET ID with a lowest value from each CORESET ID of the one or more CORESETs is the CORESET ID identifying the CORESET.

The PDSCH transmitter 1235 may transmit the PDSCH transmission in accordance with the at least one TCI state. In some examples, the PDSCH transmitter 1235 may transmit the PDSCH transmission in accordance with one of the two activated TCI states. In some cases, the PDSCH transmitter 1235 may transmit the PDSCH transmission in accordance with both of the two activated TCI states.

Figure 13:
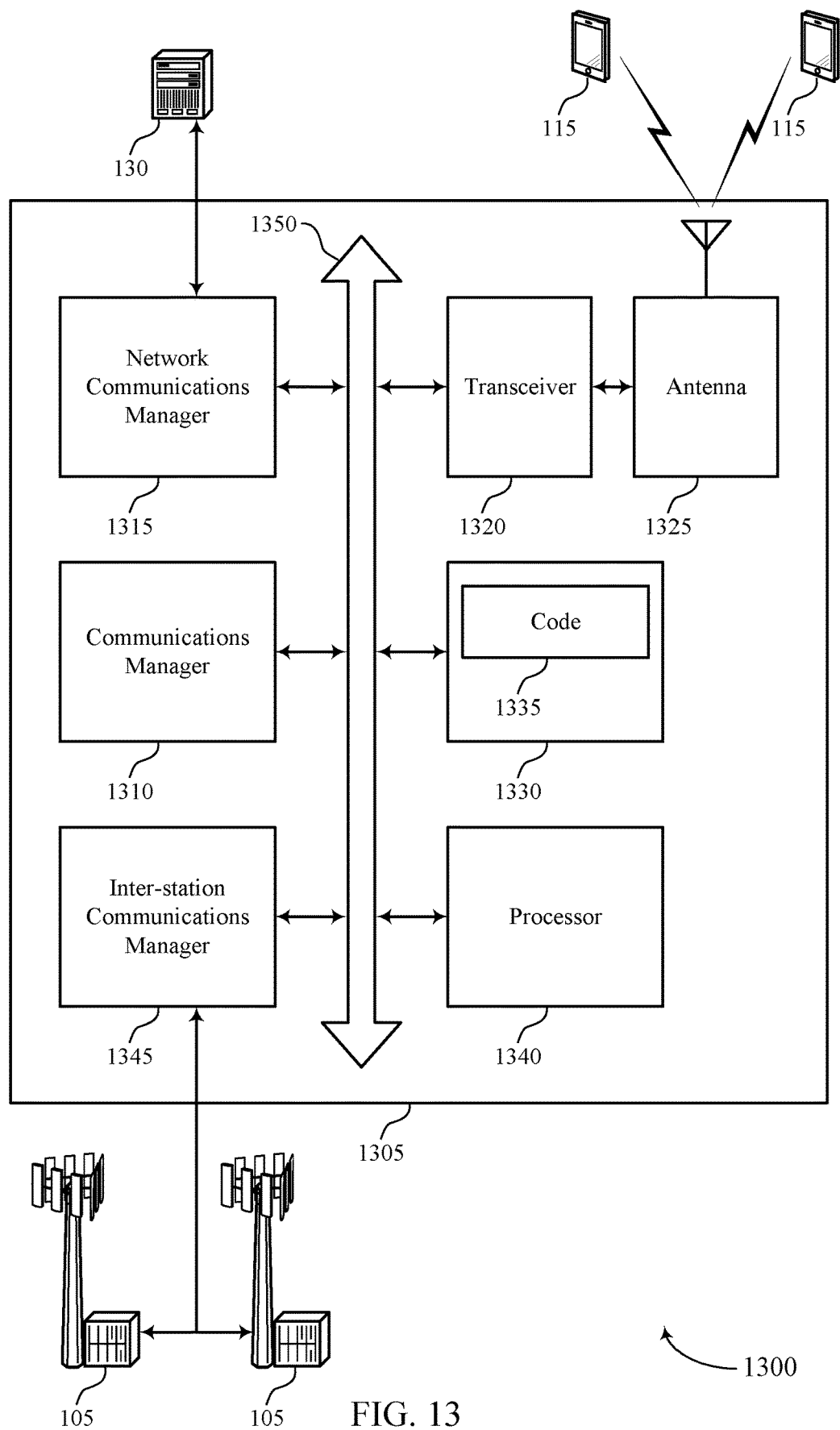
FIG. 13 shows a diagram of a system including a device that supports signaling for configuring downlink transmissions in accordance with aspects of the present disclosure.

FIG. 13 shows a diagram of a system 1300 including a device 1305 that supports signaling for configuring downlink transmissions in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may identify a configuration indicating that a CORESET for a downlink control channel is associated with a set of TCI states, transmit, to a UE, a configuration message indicating the identified configuration, and transmit, to the UE, a control message activating one or more TCI states for the CORESET.

Additionally, the communications manager 1310 may transmit, to a UE, a configuration message indicating that a CORESET is associated with a set of activated TCI states, transmit, to the UE, a physical downlink control transmission over the CORESET in accordance with the configuration message, the physical downlink control transmission including scheduling information for a PDSCH transmission, identify, based on an absence of a TCI field included in the scheduling information that indicates a TCI state for the PDSCH transmission, at least one TCI state of the set of activated TCI states to apply to a transmission of the PDSCH transmission, and transmit the PDSCH transmission in accordance with the at least one TCI state.

Additionally, the communications manager 1310 may also transmit, to a UE, a configuration message indicating that a CORESET is associated with a set of activated TCI states, transmit, to the UE, a physical downlink control transmission, the physical downlink control transmission including scheduling information for a PDSCH transmission, identify, based on a scheduling offset for the PDSCH transmission being less than a threshold scheduling offset, at least one TCI state of the set of activated TCI states to apply to a transmission of the PDSCH transmission, and transmit the PDSCH transmission in accordance with the at least one TCI state.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting signaling for configuring downlink transmissions).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
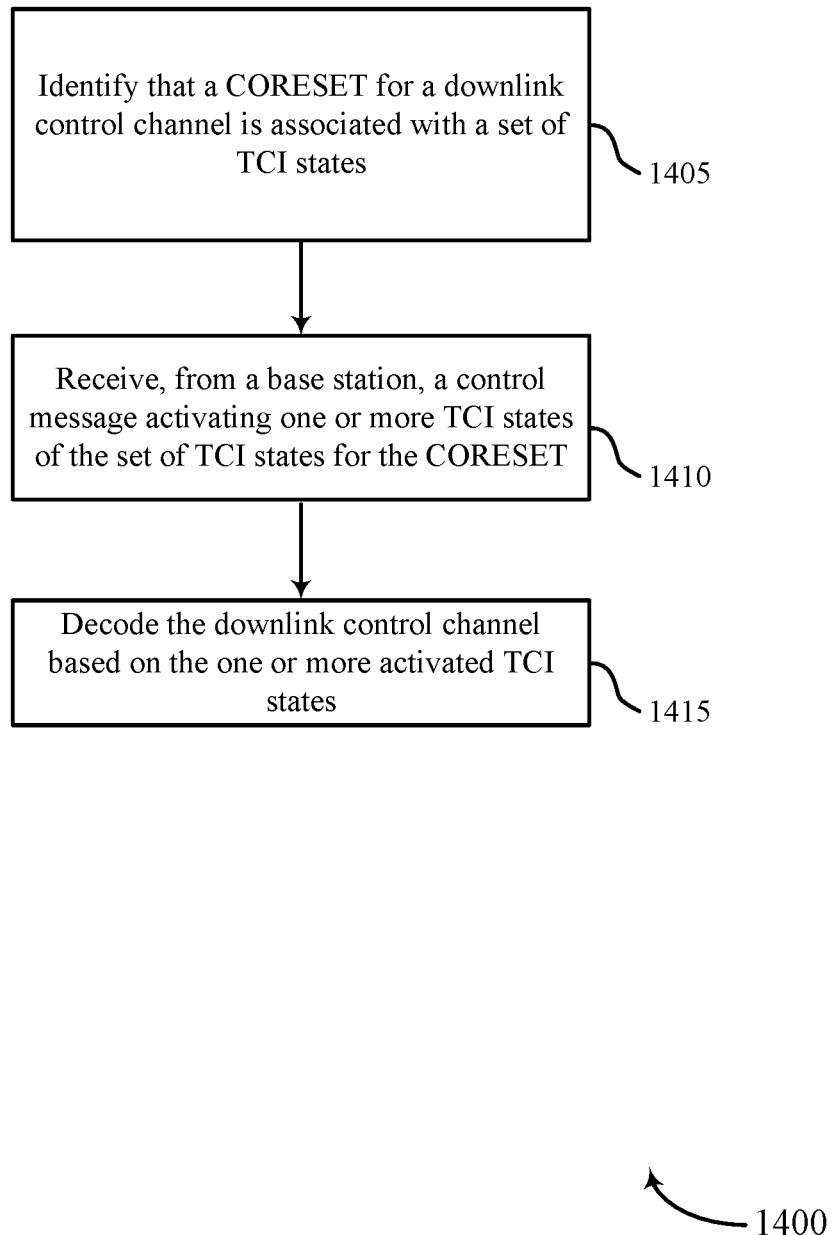
FIGS. 14 through 22 show flowcharts illustrating methods that support signaling for configuring downlink transmissions in accordance with aspects of the present disclosure.

FIG. 14 shows a flowchart illustrating a method 1400 that supports signaling for configuring downlink transmissions in accordance with aspects of the present disclosure. The operations of method 1400 may be implemented by a UE 115 or its components as described herein. For example, the operations of method 1400 may be performed by a UE coding manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1405, the UE may identify that a CORESET for a downlink control channel is associated with a set of TCI states. The operations of 1405 may be performed according to the methods described herein. In some examples, aspects of the operations of 1405 may be performed by a configuration message manager as described with reference to FIGS. 6 through 9.

At 1410, the UE may receive, from a base station, a control message activating one or more TCI states for the CORESET. The operations of 1410 may be performed according to the methods described herein. In some examples, aspects of the operations of 1410 may be performed by a control message manager as described with reference to FIGS. 6 through 9.

At 1415, the UE may decode the downlink control channel based on the one or more activated TCI states. The operations of 1415 may be performed according to the methods described herein. In some examples, aspects of the operations of 1415 may be performed by a PDCCH receiver as described with reference to FIGS. 6 through 9.

Figure 15:
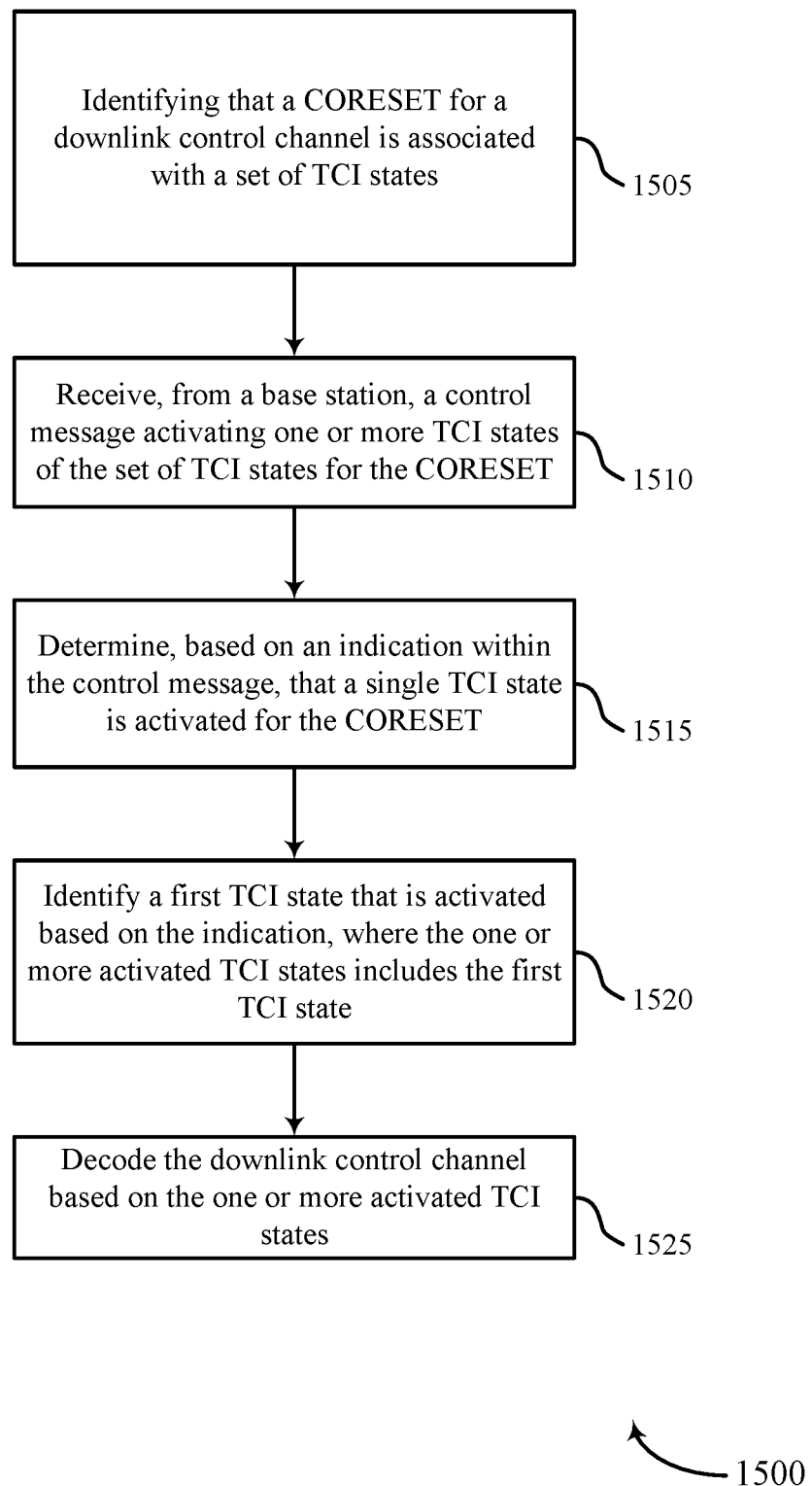

FIG. 15 shows a flowchart illustrating a method 1500 that supports signaling for configuring downlink transmissions in accordance with aspects of the present disclosure. The operations of method 1500 may be implemented by a UE 115 or its components as described herein. For example, the operations of method 1500 may be performed by a UE coding manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1505, the UE may identify that a CORESET for a downlink control channel is associated with a set of TCI states. The operations of 1505 may be performed according to the methods described herein. In some examples, aspects of the operations of 1505 may be performed by a configuration message manager as described with reference to FIGS. 6 through 9.

At 1510, the UE may receive, from a base station, a control message activating one or more TCI states for the CORESET. The operations of 1510 may be performed according to the methods described herein. In some examples, aspects of the operations of 1510 may be performed by a control message manager as described with reference to FIGS. 6 through 9.

At 1515, the UE may determine, based on an indication within the control message, that a single TCI state is activated for the CORESET. The operations of 1515 may be performed according to the methods described herein. In some examples, aspects of the operations of 1515 may be performed by a single activated TCI state manager as described with reference to FIGS. 6 through 9.

At 1520, the UE may identify a first TCI state that is activated based on the indication, where the one or more activated TCI states includes the first TCI state. The operations of 1520 may be performed according to the methods described herein. In some examples, aspects of the operations of 1520 may be performed by a single activated TCI state manager as described with reference to FIGS. 6 through 9.

At 1525, the UE may decode the downlink control channel based on the one or more activated TCI states. The operations of 1525 may be performed according to the methods described herein. In some examples, aspects of the operations of 1525 may be performed by a PDCCH receiver as described with reference to FIGS. 6 through 9.

Figure 16:
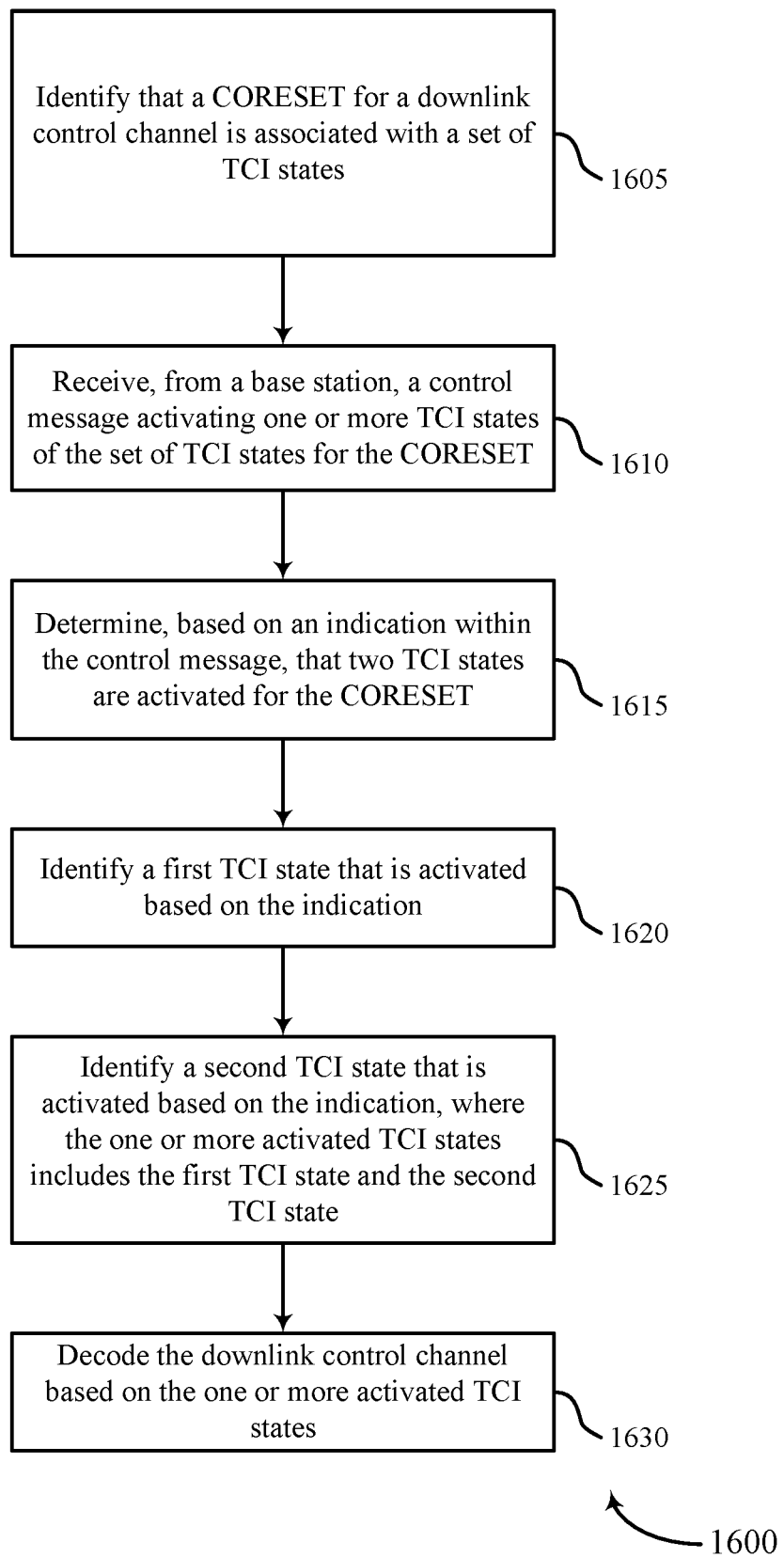

FIG. 16 shows a flowchart illustrating a method 1600 that supports signaling for configuring downlink transmissions in accordance with aspects of the present disclosure. The operations of method 1600 may be implemented by a UE 115 or its components as described herein. For example, the operations of method 1600 may be performed by a UE coding manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1605, the UE may identify that a CORESET for a downlink control channel is associated with a set of TCI states. The operations of 1605 may be performed according to the methods described herein. In some examples, aspects of the operations of 1605 may be performed by a configuration message manager as described with reference to FIGS. 6 through 9.

At 1610, the UE may receive, from a base station, a control message activating one or more TCI states for the CORESET. The operations of 1610 may be performed according to the methods described herein. In some examples, aspects of the operations of 1610 may be performed by a control message manager as described with reference to FIGS. 6 through 9.

At 1615, the UE may determine, based on an indication within the control message, that two TCI states are activated for the CORESET. The operations of 1615 may be performed according to the methods described herein. In some examples, aspects of the operations of 1615 may be performed by a multiple activated TCI state manager as described with reference to FIGS. 6 through 9.

At 1620, the UE may identify a first TCI state that is activated based on the indication. The operations of 1620 may be performed according to the methods described herein. In some examples, aspects of the operations of 1620 may be performed by a multiple activated TCI state manager as described with reference to FIGS. 6 through 9.

At 1625, the UE may identify a second TCI state that is activated based on the indication, where the one or more activated TCI states includes the first TCI state and the second TCI state. The operations of 1625 may be performed according to the methods described herein. In some examples, aspects of the operations of 1625 may be performed by a multiple activated TCI state manager as described with reference to FIGS. 6 through 9.

At 1630, the UE may decode the downlink control channel based on the one or more activated TCI states. The operations of 1630 may be performed according to the methods described herein. In some examples, aspects of the operations of 1630 may be performed by a PDCCH receiver as described with reference to FIGS. 6 through 9.

Figure 17:
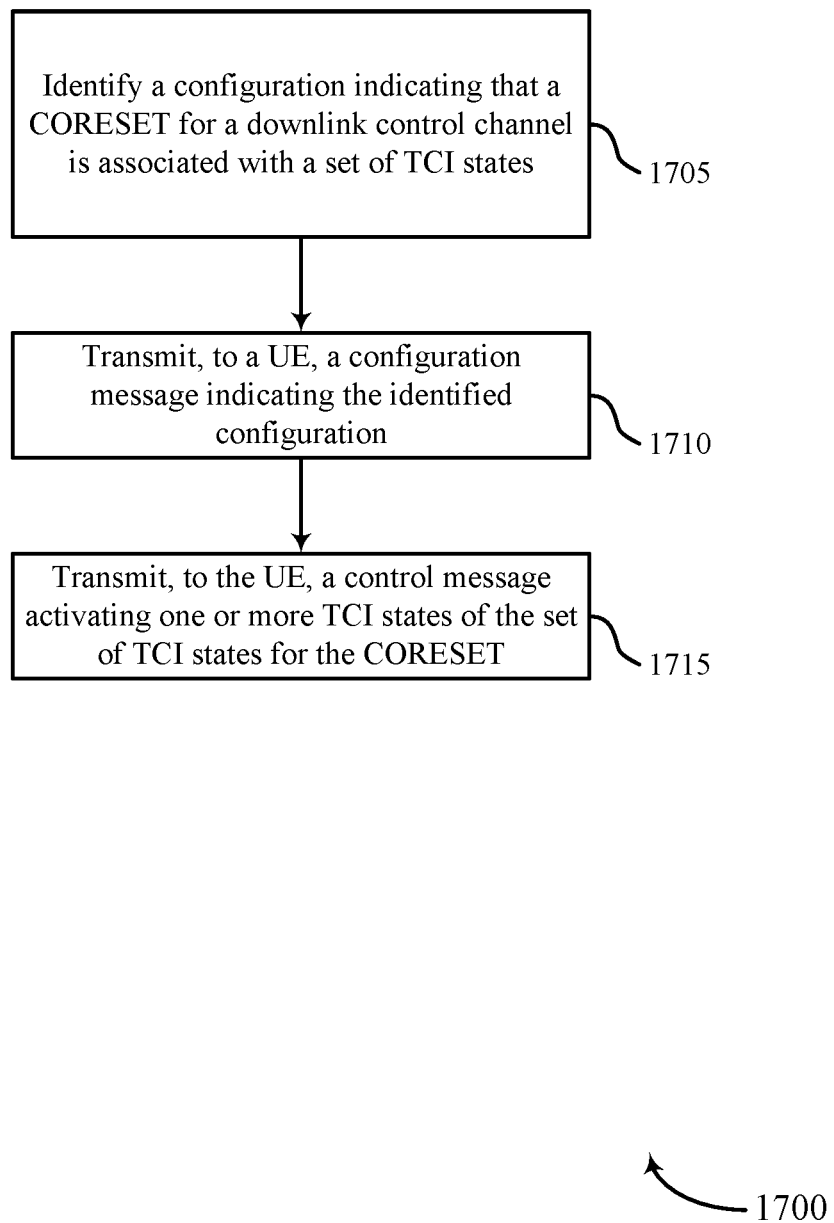

FIG. 17 shows a flowchart illustrating a method 1700 that supports signaling for configuring downlink transmissions in accordance with aspects of the present disclosure. The operations of method 1700 may be implemented by a base station 105 or its components as described herein. For example, the operations of method 1700 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1705, the base station may identify a configuration indicating that a CORESET for a downlink control channel is associated with a set of TCI states. The operations of 1705 may be performed according to the methods described herein. In some examples, aspects of the operations of 1705 may be performed by a configuration identifier as described with reference to FIGS. 10 through 13.

At 1710, the base station may transmit, to a UE, a configuration message indicating the identified configuration. The operations of 1710 may be performed according to the methods described herein. In some examples, aspects of the operations of 1710 may be performed by a configuration message transmitter as described with reference to FIGS. 10 through 13.

At 1715, the base station may transmit, to the UE, a control message activating one or more TCI states for the CORESET. The operations of 1715 may be performed according to the methods described herein. In some examples, aspects of the operations of 1715 may be performed by a control message transmitter as described with reference to FIGS. 10 through 13.

Figure 18:
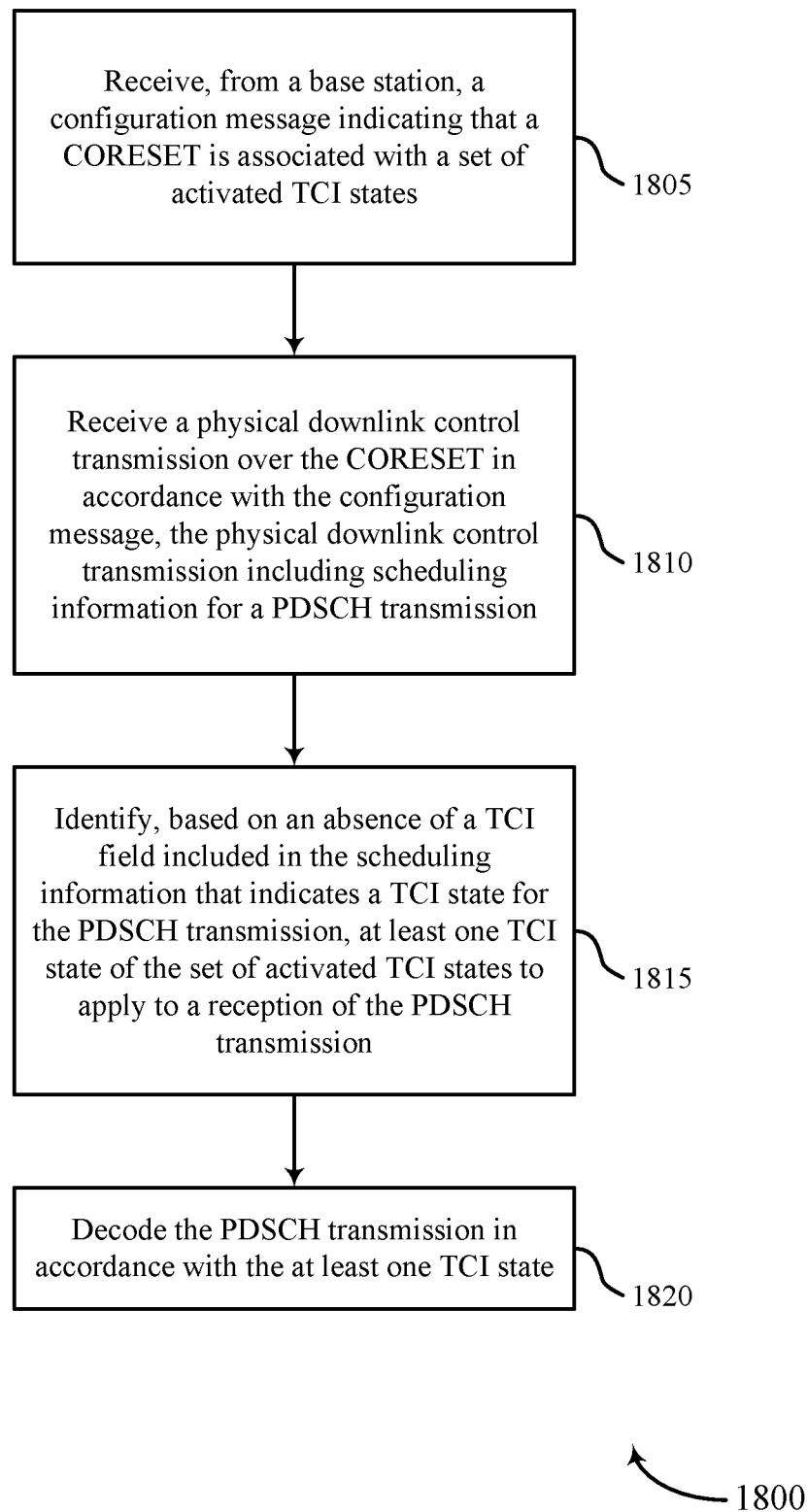

FIG. 18 shows a flowchart illustrating a method 1800 that supports signaling for configuring downlink transmissions in accordance with aspects of the present disclosure. The operations of method 1800 may be implemented by a UE 115 or its components as described herein. For example, the operations of method 1800 may be performed by a UE coding manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1805, the UE may receive, from a base station, a configuration message indicating that a CORESET is associated with a set of activated TCI states. The operations of 1805 may be performed according to the methods described herein. In some examples, aspects of the operations of 1805 may be performed by a configuration message manager as described with reference to FIGS. 6 through 9.

At 1810, the UE may receive a physical downlink control transmission over the CORESET in accordance with the configuration message, the physical downlink control transmission including scheduling information for a PDSCH transmission. The operations of 1810 may be performed according to the methods described herein. In some examples, aspects of the operations of 1810 may be performed by a PDCCH receiver as described with reference to FIGS. 6 through 9.

At 1815, the UE may identify, based on an absence of a TCI field included in the scheduling information that indicates a TCI state for the PDSCH transmission, at least one TCI state of the set of activated TCI states to apply to a reception of the PDSCH transmission. The operations of 1815 may be performed according to the methods described herein. In some examples, aspects of the operations of 1815 may be performed by a PDSCH TCI state manager as described with reference to FIGS. 6 through 9.

At 1820, the UE may decode the PDSCH transmission in accordance with the at least one TCI state. The operations of 1820 may be performed according to the methods described herein. In some examples, aspects of the operations of 1820 may be performed by a PDSCH receiver as described with reference to FIGS. 6 through 9.

Figure 19:
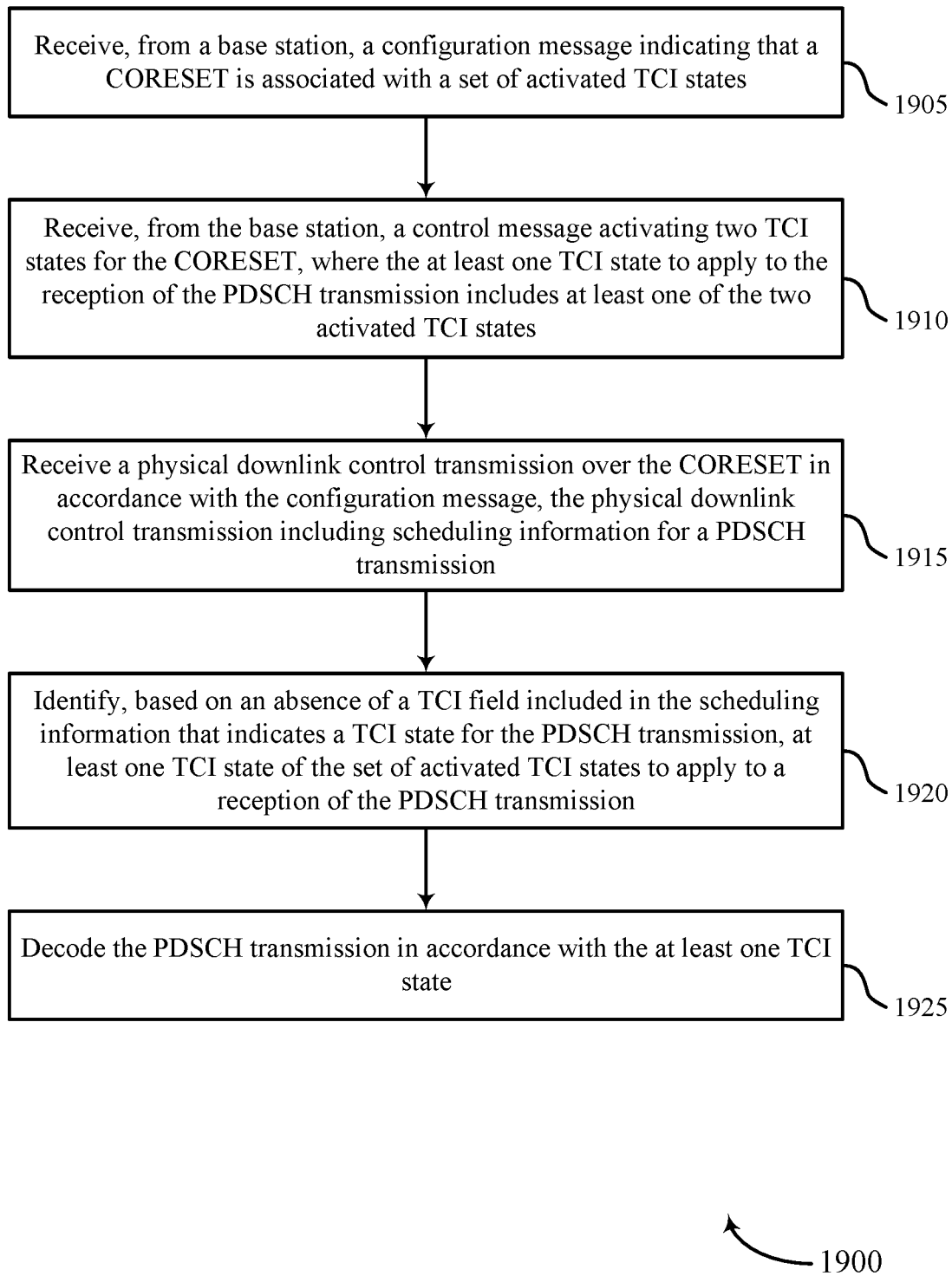

FIG. 19 shows a flowchart illustrating a method 1900 that supports signaling for configuring downlink transmissions in accordance with aspects of the present disclosure. The operations of method 1900 may be implemented by a UE 115 or its components as described herein. For example, the operations of method 1900 may be performed by a UE coding manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1905, the UE may receive, from a base station, a configuration message indicating that a CORESET is associated with a set of TCI states. The operations of 1905 may be performed according to the methods described herein. In some examples, aspects of the operations of 1905 may be performed by a configuration message manager as described with reference to FIGS. 6 through 9.

At 1910, the UE may receive, from the base station, a control message activating two TCI states for the CORESET, where the at least one TCI state to apply to the reception of the PDSCH transmission includes at least one of the two activated TCI states. The operations of 1910 may be performed according to the methods described herein. In some examples, aspects of the operations of 1910 may be performed by a control message manager as described with reference to FIGS. 6 through 9.

At 1915, the UE may receive a physical downlink control transmission over the CORESET in accordance with the configuration message, the physical downlink control transmission including scheduling information for a PDSCH transmission. The operations of 1915 may be performed according to the methods described herein. In some examples, aspects of the operations of 1915 may be performed by a PDCCH receiver as described with reference to FIGS. 6 through 9.

At 1920, the UE may identify, based on an absence of a TCI field included in the scheduling information that indicates a TCI state for the PDSCH transmission, at least one TCI state of the set of activated TCI states to apply to a reception of the PDSCH transmission. The operations of 1920 may be performed according to the methods described herein. In some examples, aspects of the operations of 1920 may be performed by a PDSCH TCI state manager as described with reference to FIGS. 6 through 9.

At 1925, the UE may decode the PDSCH transmission in accordance with the at least one TCI state. The operations of 1925 may be performed according to the methods described herein. In some examples, aspects of the operations of 1925 may be performed by a PDSCH receiver as described with reference to FIGS. 6 through 9.

Figure 20:
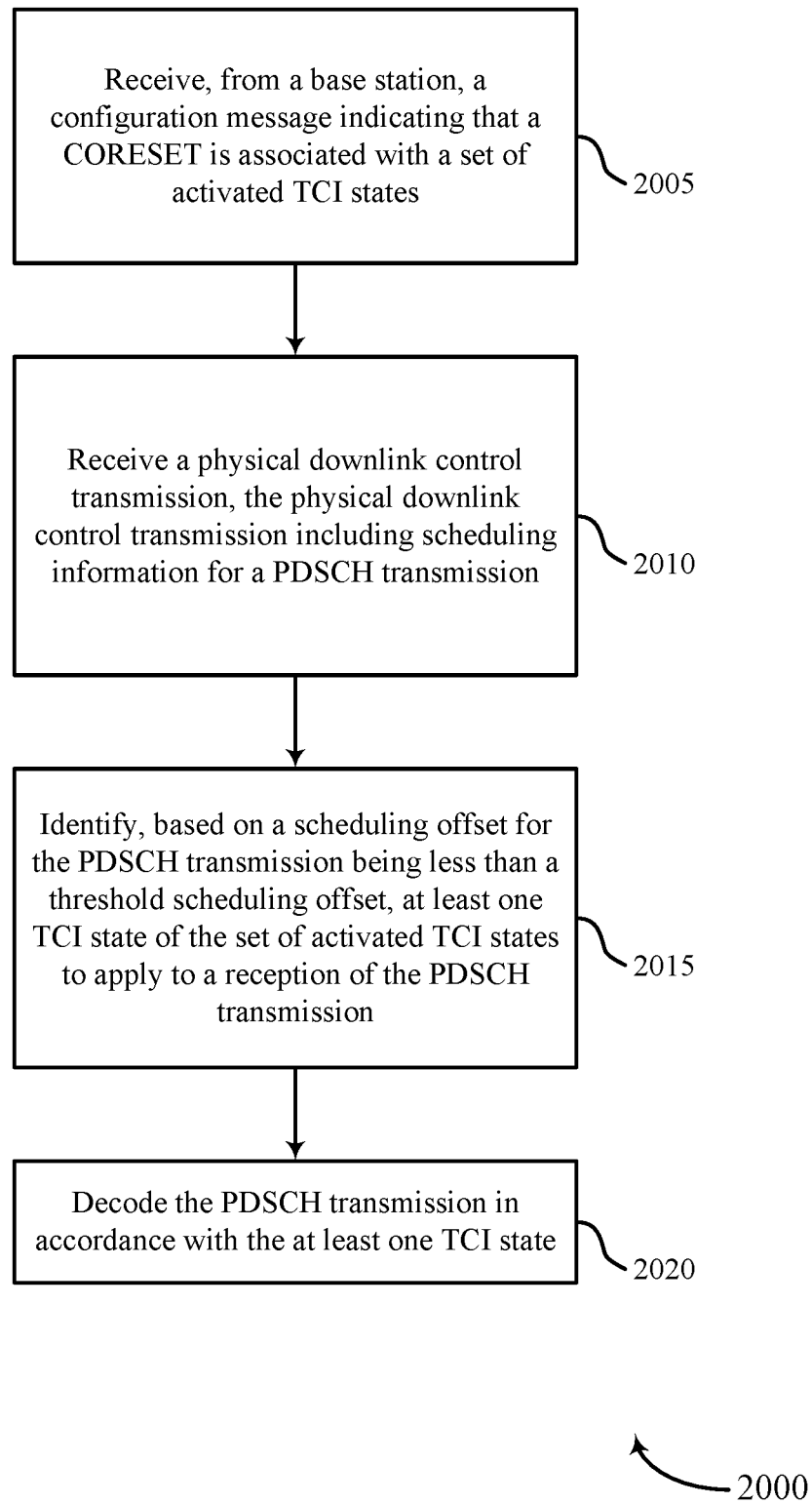

FIG. 20 shows a flowchart illustrating a method 2000 that supports signaling for configuring downlink transmissions in accordance with aspects of the present disclosure. The operations of method 2000 may be implemented by a UE 115 or its components as described herein. For example, the operations of method 2000 may be performed by a UE coding manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 2005, the UE may receive, from a base station, a configuration message indicating that a CORESET is associated with a set of activated TCI states. The operations of 2005 may be performed according to the methods described herein. In some examples, aspects of the operations of 2005 may be performed by a configuration message manager as described with reference to FIGS. 6 through 9.

At 2010, the UE may receive a physical downlink control transmission, the physical downlink control transmission including scheduling information for a PDSCH transmission. The operations of 2010 may be performed according to the methods described herein. In some examples, aspects of the operations of 2010 may be performed by a PDCCH receiver as described with reference to FIGS. 6 through 9.

At 2015, the UE may identify, based on a scheduling offset for the PDSCH transmission being less than a threshold scheduling offset, at least one TCI state of the set of activated TCI states to apply to a reception of the PDSCH transmission. The operations of 2015 may be performed according to the methods described herein. In some examples, aspects of the operations of 2015 may be performed by a PDSCH TCI state manager as described with reference to FIGS. 6 through 9.

At 2020, the UE may decode the PDSCH transmission in accordance with the at least one TCI state. The operations of 2020 may be performed according to the methods described herein. In some examples, aspects of the operations of 2020 may be performed by a PDSCH receiver as described with reference to FIGS. 6 through 9.

Figure 21:
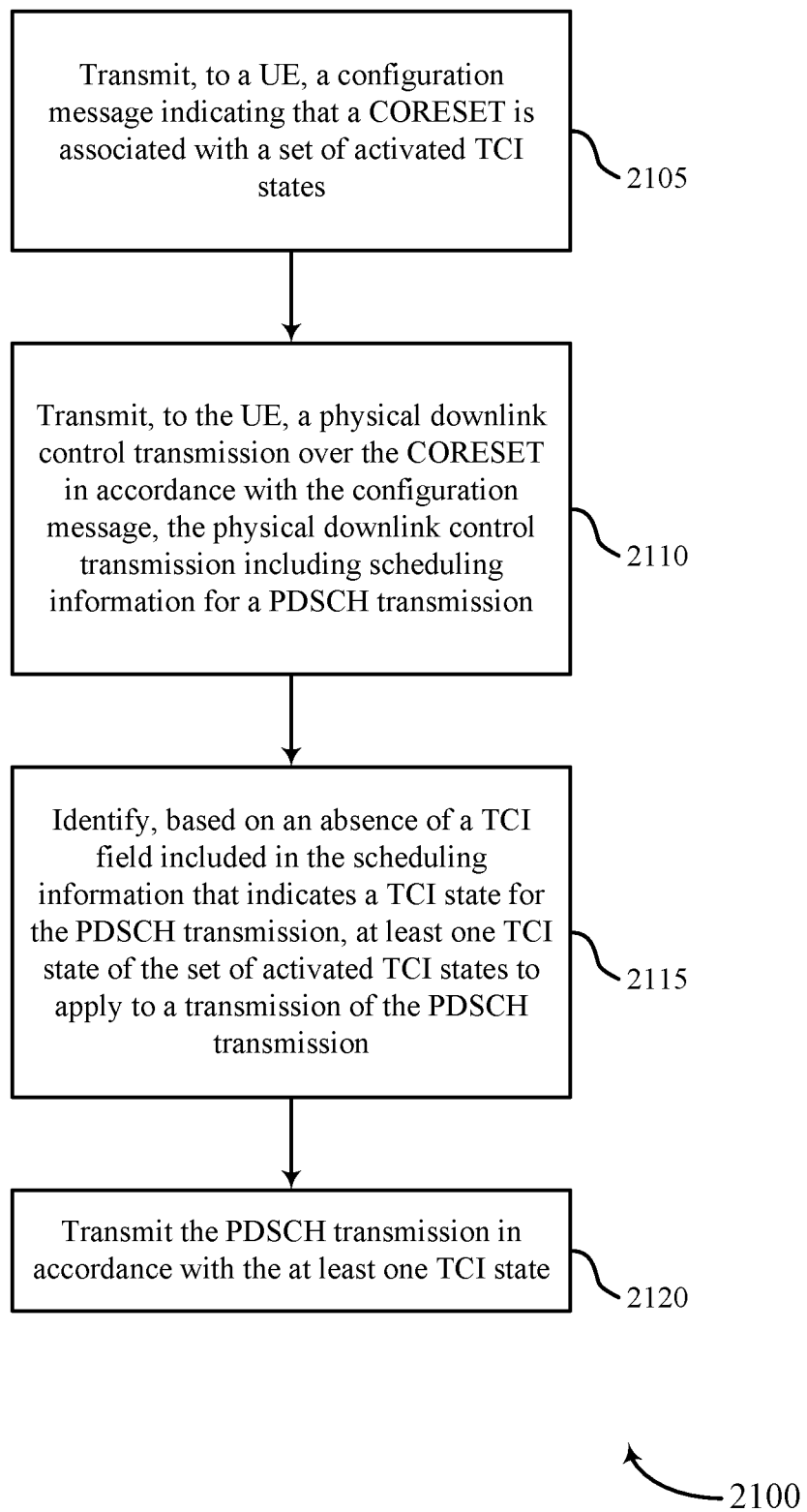

FIG. 21 shows a flowchart illustrating a method 2100 that supports signaling for configuring downlink transmissions in accordance with aspects of the present disclosure. The operations of method 2100 may be implemented by a base station 105 or its components as described herein. For example, the operations of method 2100 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 2105, the base station may transmit, to a UE, a configuration message indicating that a CORESET is associated with a set of activated TCI states. The operations of 2105 may be performed according to the methods described herein. In some examples, aspects of the operations of 2105 may be performed by a configuration message transmitter as described with reference to FIGS. 10 through 13.

At 2110, the base station may transmit, to the UE, a physical downlink control transmission over the CORESET in accordance with the configuration message, the physical downlink control transmission including scheduling information for a PDSCH transmission. The operations of 2110 may be performed according to the methods described herein. In some examples, aspects of the operations of 2110 may be performed by a downlink control message transmitter as described with reference to FIGS. 10 through 13.

At 2115, the base station may identify, based on an absence of a TCI field included in the scheduling information that indicates a TCI state for the PDSCH transmission, at least one TCI state of the set of activated TCI states to apply to a transmission of the PDSCH transmission. The operations of 2115 may be performed according to the methods described herein. In some examples, aspects of the operations of 2115 may be performed by a PDSCH TCI state component as described with reference to FIGS. 10 through 13.

At 2120, the base station may transmit the PDSCH transmission in accordance with the at least one TCI state. The operations of 2120 may be performed according to the methods described herein. In some examples, aspects of the operations of 2120 may be performed by a PDSCH transmitter as described with reference to FIGS. 10 through 13.

Figure 22:
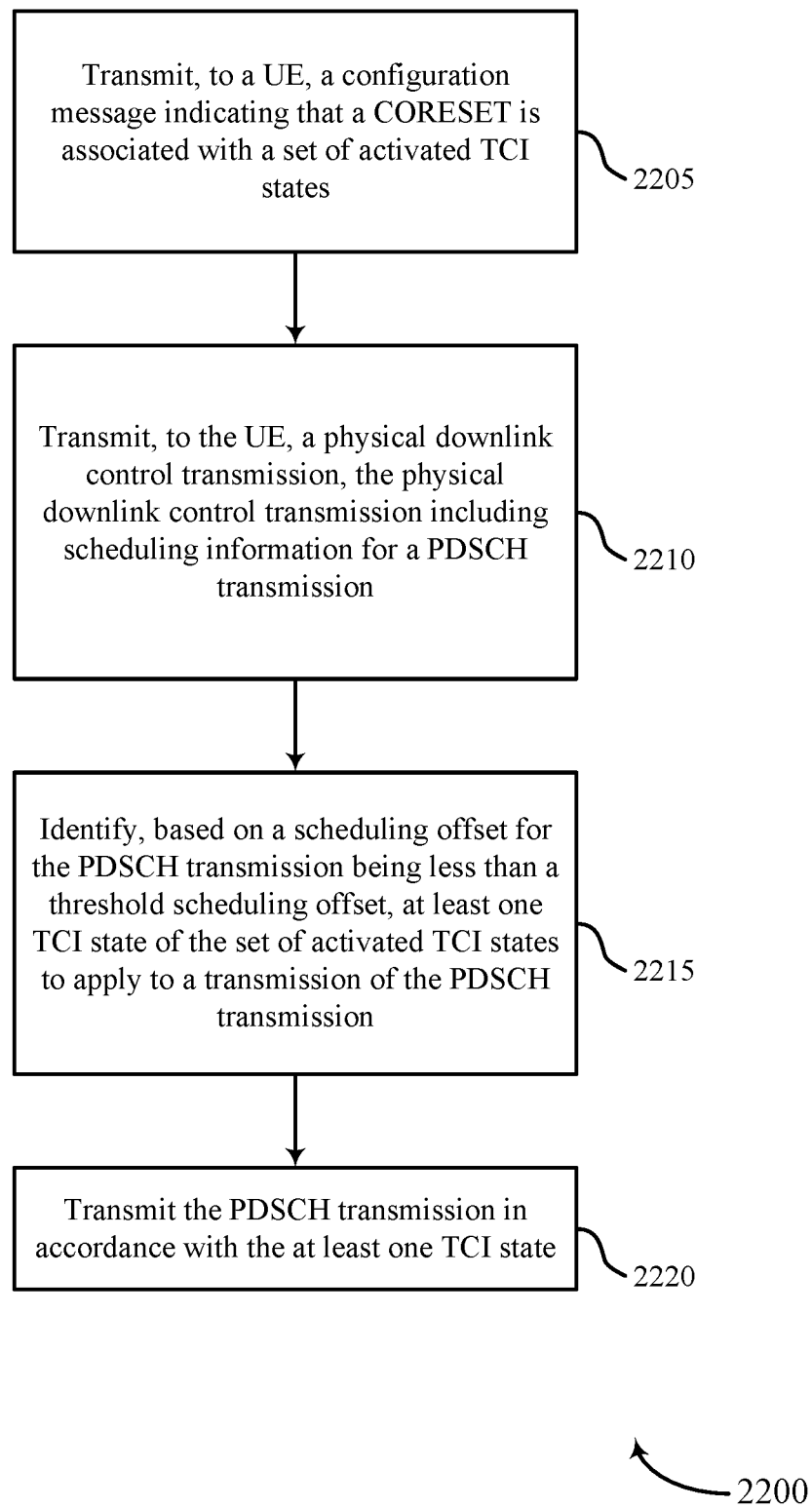

FIG. 22 shows a flowchart illustrating a method 2200 that supports signaling for configuring downlink transmissions in accordance with aspects of the present disclosure. The operations of method 2200 may be implemented by a base station 105 or its components as described herein. For example, the operations of method 2200 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 2205, the base station may transmit, to a UE, a configuration message indicating that a CORESET is associated with a set of activated TCI states. The operations of 2205 may be performed according to the methods described herein. In some examples, aspects of the operations of 2205 may be performed by a configuration message transmitter as described with reference to FIGS. 10 through 13.

At 2210, the base station may transmit, to the UE, a physical downlink control transmission, the physical downlink control transmission including scheduling information for a PDSCH transmission. The operations of 2210 may be performed according to the methods described herein. In some examples, aspects of the operations of 2210 may be performed by a downlink control message transmitter as described with reference to FIGS. 10 through 13.

At 2215, the base station may identify, based on a scheduling offset for the PDSCH transmission being less than a threshold scheduling offset, at least one TCI state of the set of activated TCI states to apply to a transmission of the PDSCH transmission. The operations of 2215 may be performed according to the methods described herein. In some examples, aspects of the operations of 2215 may be performed by a PDSCH TCI state component as described with reference to FIGS. 10 through 13.

At 2220, the base station may transmit the PDSCH transmission in accordance with the at least one TCI state. The operations of 2220 may be performed according to the methods described herein. In some examples, aspects of the operations of 2220 may be performed by a PDSCH transmitter as described with reference to FIGS. 10 through 13.

It should be noted that the methods described herein describe possible implementations, and that the operations and the steps may be rearranged or otherwise modified and that other implementations are possible. Further, aspects from two or more of the methods may be combined.

Various aspects of the described techniques are provided. Aspect 1: A method for wireless communication by a UE, comprising: identify that a CORESET for a downlink control channel is associated with a plurality of TCI states; receiving, from a base station, a control message activating one or more TCI states of the plurality of TCI states for the CORESET; and decoding the downlink control channel based at least in part on the one or more activated TCI states.

Aspect 2: The method of aspect 1, further comprising: receiving, from the base station, a configuration message indicating that the control resource set for the downlink control channel is associated with the plurality of TCI states.

Aspect 3: The method of aspect 1, further comprising: determining, based at least in part on an indication within the control message, that a single TCI state is activated for the CORESET; and identifying a first TCI state that is activated based at least in part on the indication, wherein the one or more activated TCI states comprises the first TCI state.

Aspect 4: The method of aspect 3, further comprising: determining, based at least in part on an indication within the control message, that two TCI states are activated for the CORESET; identifying a first TCI state that is activated based at least in part on the indication; and identifying a second TCI state that is activated based at least in part on the indication, wherein the one or more activated TCI states comprises the first TCI state and the second TCI state.

Aspect 5: The method of any of aspects 1 through 4, wherein receiving the control message comprises: receiving an indication of the one or more activated TCI states, wherein the indication comprises one or more TCI state IDs.

Aspect 6: The method of any of aspects 1 through 5, wherein receiving the control message comprises: receiving an indication of the one or more activated TCI states, wherein the indication comprises one or more indices associated with the one or more activated TCI states.

Aspect 7: The method of any of aspects 1 through 6, wherein the control message comprises a first field configured to indicate a first TCI state, a second field configured to indicate a second TCI state, and a third field configured to indicate which TCI state of the first TCI state, the second TCI state, or both TCI states are activated.

Aspect 8: The method of any of aspects 1 through 7, wherein the third field is configured to indicate whether the control message comprises the second field.

Aspect 9: The method of any of aspects 1 through 7, wherein the control message comprises a dynamic number of fields based at least in part on a quantity of activated TCI states.

Aspect 10: The method of any of aspects 1 through 9, wherein the configuration message further indicates that the plurality of TCI states are mapped using either a FDM mapping, a TDM mapping, or a space division multiplexing mapping.

Aspect 11: The method of any of aspects 1 through 10, wherein the configuration message further indicates parameters for mapping the plurality of TCI states using at least two of a FDM mapping scheme, a TDM mapping scheme, and a space division multiplexing mapping scheme; and the control message indicates one of the FDM mapping scheme, the TDM mapping scheme, or the space division multiplexing mapping scheme for mapping of the one or more activated TCI states.

Aspect 12: The method of any of aspects 1 through 11, wherein the control message comprises an indication of a group of CCs to which the control message pertains.

Aspect 13: The method of any of aspects 1 through 12, wherein the control message is a MAC-CE.

Aspect 14: The method of any of aspects 1 through 13, wherein the configuration message is a RRC message.

Aspect 15: A method for wireless communication by a base station, comprising: identifying a configuration indicating that a CORESET for a downlink control channel is associated with a plurality of TCI states; transmitting, to a UE, a configuration message indicating the identified configuration; and transmitting, to the UE, a control message activating one or more TCI states of the plurality of TCI states for the CORESET.

Aspect 16: The method of aspect 15, further comprising: transmitting, to the UE, a downlink control message via the downlink control channel according to the one or more activated TCI states for the CORESET.

Aspect 17: The method of any of aspects 15 through 16, wherein the control message comprises an indication that a single TCI state is activated for the CORESET; the indication indicates a first TCI state that is activated; and the one or more activated TCI states comprise the first TCI state.

Aspect 18: The method of any of aspects 15 through 16, wherein the control message comprises an indication that two TCI states are activated for the CORESET; the indication indicates that a first TCI state and a second TCI state are activated; and the one or more activated TCI states comprise the first TCI state and the second TCI state.

Aspect 19: The method of any of aspects 15 through 18, wherein transmitting the configuration message comprises: transmitting an indication of the one or more activated TCI states, wherein the indication comprises a TCI state ID.

Aspect 20: The method of any of aspects 15 through 19, wherein transmitting the configuration message comprises: transmitting an indication of the one or more TCI states, wherein the indication comprises one or more indices associated with the one or more activated TCI states.

Aspect 21: The method of any of aspects 15 through 20, wherein the control message comprises a first field configured to indicate a first TCI state, a second field configured to indicate a second TCI state, and a third field configured to indicate which TCI state of the first TCI state, the second TCI state, or both TCI states are activated.

Aspect 22: The method of any of aspects 15 through 21, wherein the control message comprises a dynamic number of fields based at least in part on a quantity of activated TCI states.

Aspect 23: The method of any of aspects 15 through 22, wherein the configuration message further indicates that the plurality of TCI states are mapped using either a FDM mapping, a TDM mapping, or a space division multiplexing mapping.

Aspect 24: The method of any of aspects 15 through 23, wherein the configuration message further indicates parameters for mapping the plurality of TCI states using at least two of a FDM mapping scheme, a TDM mapping scheme, and a space division multiplexing mapping scheme; and the control message indicates one of the FDM mapping scheme, the TDM mapping scheme, or the space division multiplexing mapping scheme for mapping of the one or more activated TCI states.

Aspect 25: The method of any of aspects 15 through 24, wherein the control message comprises an indication of a group of CCs to which the control message pertains.

Aspect 26: The method of any of aspects 15 through 25, wherein the control message is a MAC control element.

Aspect 27: The method of any of aspects 15 through 26, wherein the configuration message is a RRC message.

Aspect 28: A method for wireless communications at a UE, comprising: receiving, from a base station, a configuration message indicating that a CORESET is associated with a plurality of activated TCI states; receiving a physical downlink control transmission over the CORESET in accordance with the configuration message, the physical downlink control transmission comprising scheduling information for a PDSCH transmission; identifying, based at least in part on an absence of a TCI field included in the scheduling information that indicates a TCI state for the PDSCH transmission, at least one TCI state of the plurality of activated TCI states to apply to a reception of the PDSCH transmission; and decoding the PDSCH transmission in accordance with the at least one TCI state.

Aspect 29: The method of aspect 28, wherein the identifying is based at least in part on a scheduling offset for the PDSCH transmission that is larger than a threshold scheduling offset.

Aspect 30: The method of aspect 29, wherein the threshold scheduling offset is a time duration for QCL.

Aspect 31: The method of any of aspects 28 through 30, further comprising: receiving, from the base station, a control message activating two TCI states for the CORESET, wherein the at least one TCI state to apply to the reception of the PDSCH transmission comprises at least one of the two activated TCI states.

Aspect 32: The method of aspect 31, further comprising: determining, based at least in part on the scheduling information for the PDSCH transmission, to apply one of the two activated TCI states to the reception of the PDSCH transmission.

Aspect 33: The method of aspect 32, further comprising: identifying one of the two activated TCI states to apply to the reception of the PDSCH transmission based at least in part on a relative value of a TCI state ID for each of the two activated TCI states or a relative position of two fields within the control message each indicating one of the two activated TCI states.

Aspect 34: The method of aspect 35, further comprising: determining, based at least in part on the scheduling information for the PDSCH transmission, to apply both of the two activated TCI states to the reception of the PDSCH transmission.

Aspect 36: The method of any of aspects 37 through 38, further comprising: decoding the physical downlink control transmission based at least in part on the configuration message and at least one of the two activated TCI states.

Aspect 39: A method for wireless communications at a UE, comprising: receiving, from a base station, a configuration message indicating that a CORESET is associated with a plurality of activated TCI states; receiving a physical downlink control transmission, the physical downlink control transmission comprising scheduling information for a PDSCH transmission; identifying, based at least in part on a scheduling offset for the PDSCH transmission being less than a threshold scheduling offset, at least one TCI state of the plurality of activated TCI states to apply to a reception of the PDSCH transmission; and decoding the PDSCH transmission in accordance with the at least one TCI state.

Aspect 40: The method of aspect 39, wherein the threshold scheduling offset is a time duration for QCL.

Aspect 41: The method of any of aspects 39 through 40, further comprising: identifying one or more CORESETs each associated with a transmission received prior to decoding the PDSCH transmission; determining a subset of the one or more CORESETs that excludes CORESETs of the one or more CORESETs that are associated with a plurality of activated TCI states; and identifying a CORESET from the subset of the one or more CORESETs having a CORESET ID with a value less than each CORESET ID of other CORESETs from the subset of the one or more CORESETs, wherein the at least one TCI state to apply to the reception of the PDSCH transmission comprises a TCI state associated with the identified CORESET having the CORESET ID with the value less than each CORESET ID of other CORESETs.

Aspect 42: The method of any of aspects 39 through 43, further comprising: identifying the CORESET associated with two activated TCI states, wherein the at least one TCI state to apply to the reception of the PDSCH transmission comprises at least one of the two activated TCI states.

Aspect 44: The method of aspect 45 wherein identifying the CORESET further comprises: identifying one or more CORESETs associated with a transmission received prior to identifying the CORESET; and determining that a CORESET ID with a lowest value from each CORESET ID of the one or more CORESETs is the CORESET ID identifying the CORESET.

Aspect 46: The method of any of aspects 47 through 48, further comprising: determining to apply one of the two activated TCI states to the reception of the PDSCH transmission.

Aspect 49: The method of aspect 46, further comprising: identifying one of the two activated TCI states to apply to the reception of the PDSCH transmission based at least in part on a relative value of a TCI state ID for each of the two activated TCI states or a relative position of two fields within a control message each indicating one of the two activated TCI states.

Aspect 50: The method of any of aspects 51 through 52, further comprising: determining to apply both of the two activated TCI states to the reception of the PDSCH transmission.

Aspect 53: The method of any of aspects 54 through 50, further comprising: decoding the physical downlink control transmission based at least in part on the configuration message and at least one of the two activated TCI states.

Aspect 55: A method for wireless communications at a base station, comprising: transmitting, to a UE, a configuration message indicating that a CORESET is associated with a plurality of activated TCI states; transmitting, to the UE, a physical downlink control transmission over the CORESET in accordance with the configuration message, the physical downlink control transmission comprising scheduling information for a PDSCH transmission; identifying, based at least in part on an absence of a TCI field included in the scheduling information that indicates a TCI state for the PDSCH transmission, at least one TCI state of the plurality of activated TCI states to apply to a transmission of the PDSCH transmission; and transmitting the PDSCH transmission in accordance with the at least one TCI state.

Aspect 56: The method of aspect 55, wherein the scheduling information for the PDSCH transmission defines a scheduling offset for the PDSCH transmission that is larger than a threshold scheduling offset.

Aspect 57: The method of aspect 56, wherein the threshold scheduling offset is a time duration for QCL.

Aspect 58: The method of any of aspects 55 through 57, further comprising: transmitting, to the UE, a control message activating two TCI states for the CORESET, wherein the at least one TCI state to apply to the reception of the PDSCH transmission comprises at least one of the two activated TCI states.

Aspect 59: The method of aspect 58, wherein transmitting the PDSCH transmission further comprises: transmitting the PDSCH transmission in accordance with one of the two activated TCI states.

Aspect 60: The method of aspect 59, further comprising: identifying the one of the two activated TCI states to apply to the reception of the PDSCH transmission based at least in part on a relative value of a TCI state ID for each of the two activated TCI states or a relative position of two fields within the control message each indicating one of the two activated TCI states.

Aspect 61: The method of aspect 58, wherein transmitting the PDSCH transmission further comprises: transmitting the PDSCH transmission in accordance with both of the two activated TCI states.

Aspect 62: The method of any of aspects 58 through 61, further comprising: transmitting the physical downlink control transmission based at least in part on the configuration message and at least one of the two activated TCI states.

Aspect 63: A method for wireless communications at a base station, comprising: transmitting, to a UE, a configuration message indicating that a CORESET is associated with a plurality of activated TCI states; transmitting, to the UE, a physical downlink control transmission, the physical downlink control transmission comprising scheduling information for a PDSCH transmission; identifying, based at least in part on a scheduling offset for the PDSCH transmission being less than a threshold scheduling offset, at least one TCI state of the plurality of activated TCI states to apply to a transmission of the PDSCH transmission; and transmitting the PDSCH transmission in accordance with the at least one TCI state.

Aspect 64: The method of aspect 63, wherein the threshold scheduling offset is a time duration for QCL.

Aspect 65: The method of any of aspects 63 through 64, further comprising: identifying the CORESET associated with two activated TCI states, wherein the at least one TCI state to apply to the reception of the PDSCH transmission comprises at least one of the two activated TCI states.

Aspect 66: The method of aspect 65, wherein identifying the CORESET further comprises: identifying one or more CORESETs associated with a transmission transmitted prior to identifying the CORESET; and determining that a CORESET ID with a lowest value from each CORESET ID of the one or more CORESETs is the CORESET ID identifying the CORESET.

Aspect 67: The method of any of aspects 65 through 66, wherein transmitting the PDSCH transmission further comprises: transmitting the PDSCH transmission in accordance with one of the two activated TCI states.

Aspect 68: The method of aspect 67, further comprising: identifying the one of the two activated TCI states to apply to the reception of the PDSCH transmission based at least in part on a relative value of a TCI state ID for each of the two activated TCI states or a relative position of two fields within a control message each indicating one of the two activated TCI states.

Aspect 69: The method of any of aspects 65 through 70, wherein transmitting the PDSCH transmission further comprises: transmitting the PDSCH transmission in accordance with both of the two activated TCI states.

Aspect 71: The method of any of aspects 65 through 69, further comprising: transmitting the physical downlink control transmission based at least in part on the configuration message and at least one of the two activated TCI states.

Aspect 72: An apparatus for wireless communication by a UE, comprising a processor; memory coupled with the processor; and instructions stored in the memory and executable by the processor to cause the apparatus to perform a method of any of aspects 1 through 14.

Aspect 73: An apparatus for wireless communication by a UE, comprising at least one means for performing a method of any of aspects 1 through 14.

Aspect 74: A non-transitory computer-readable medium storing code for wireless communication by a UE, the code comprising instructions executable by a processor to perform a method of any of aspects 1 through 14.

Aspect 75: An apparatus for wireless communication by a base station, comprising a processor; memory coupled with the processor; and instructions stored in the memory and executable by the processor to cause the apparatus to perform a method of any of aspects 15 through 27.

Aspect 76: An apparatus for wireless communication by a base station, comprising at least one means for performing a method of any of aspects 15 through 27.

Aspect 77: A non-transitory computer-readable medium storing code for wireless communication by a base station, the code comprising instructions executable by a processor to perform a method of any of aspects 15 through 27.

Aspect 78: An apparatus for wireless communications at a UE, comprising a processor; memory coupled with the processor; and instructions stored in the memory and executable by the processor to cause the apparatus to perform a method of any of aspects 28 through 36.

Aspect 79: An apparatus for wireless communications at a UE, comprising at least one means for performing a method of any of aspects 28 through 36.

Aspect 80: A non-transitory computer-readable medium storing code for wireless communications at a UE, the code comprising instructions executable by a processor to perform a method of any of aspects 28 through 36.

Aspect 81: An apparatus for wireless communications at a UE, comprising a processor; memory coupled with the processor; and instructions stored in the memory and executable by the processor to cause the apparatus to perform a method of any of aspects 39 through 53.

Aspect 82: An apparatus for wireless communications at a UE, comprising at least one means for performing a method of any of aspects 39 through 53.

Aspect 83: A non-transitory computer-readable medium storing code for wireless communications at a UE, the code comprising instructions executable by a processor to perform a method of any of aspects 39 through 53.

Aspect 84: An apparatus for wireless communications at a base station, comprising a processor; memory coupled with the processor; and instructions stored in the memory and executable by the processor to cause the apparatus to perform a method of any of aspects 55 through 62.

Aspect 85: An apparatus for wireless communications at a base station, comprising at least one means for performing a method of any of aspects 55 through 62.

Aspect 86: A non-transitory computer-readable medium storing code for wireless communications at a base station, the code comprising instructions executable by a processor to perform a method of any of aspects 55 through 62.

Aspect 87: An apparatus for wireless communications at a base station, comprising a processor; memory coupled with the processor; and instructions stored in the memory and executable by the processor to cause the apparatus to perform a method of any of aspects 63 through 71.

Aspect 88: An apparatus for wireless communications at a base station, comprising at least one means for performing a method of any of aspects 63 through 71.

Aspect 89: A non-transitory computer-readable medium storing code for wireless communications at a base station, the code comprising instructions executable by a processor to perform a method of any of aspects 63 through 71.

Aspects 1 through 76 (or aspects of the aspects 1 through 76) may be combined with aspects or embodiments disclosed in other implementations.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed or unlicensed) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple CCs.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication by a user equipment (UE), comprising:
   identifying that a control resource set for a downlink control channel is associated with a plurality of transmission configuration indicator (TCI) states;
   receiving, from a network device, control information activating one or more TCI states of the plurality of TCI states for the control resource set, the plurality of TCI states comprising at least a first TCI state and a second TCI state, wherein the control information comprises a first indication of the first TCI state and a second indication of whether the first TCI state is activated or the first TCI state and the second TCI state are activated; and
   decoding the downlink control channel based at least in part on the one or more activated TCI states.

2. The method of claim 1, further comprising:
   receiving, from the network device, a configuration message indicating that the control resource set for the downlink control channel is associated with the plurality of TCI states.

3. The method of claim 1, further comprising:
   determining, based at least in part on the control information comprising the second indication that the first TCI is activated, that a single TCI state is activated for the control resource set; and identifying that the first TCI state is activated based at least in part on the second indication, wherein the one or more activated TCI states comprise the first TCI state.

4. The method of claim 1, further comprising:
determining, based at least in part on the control information comprising the second indication that the first TCI state and the second TCI are activated, that two TCI states are activated for the control resource set;
identifying that the first TCI state is activated based at least in part on the second indication; and
identifying that the second TCI state is activated based at least in part on the second indication, wherein the one or more activated TCI states comprise the first TCI state and the second TCI state.

5. The method of claim 1, wherein the first indication comprises a TCI state identification.

6. The method of claim 1, wherein the first indication comprises an index associated with the first TCI state.

7. The method of claim 1, wherein the control information comprises a first field comprising the first indication, a second field comprising a third indication of the second TCI state, and a third field comprising the second indication.

8. The method of claim 7, wherein the third field is configured to indicate whether the control information comprises the second field.

9. The method of claim 1, wherein the control information comprises a dynamic number of fields based at least in part on a quantity of activated TCI states.

10. The method of claim 2, wherein the configuration message further indicates that the plurality of TCI states are mapped using either a frequency division multiplexing mapping, a time division multiplexing mapping, or a space division multiplexing mapping.

11. The method of claim 2, wherein:
the configuration message further indicates parameters for mapping the plurality of TCI states using at least two of a frequency division multiplexing mapping scheme, a time division multiplexing mapping scheme, and a space division multiplexing mapping scheme; and
the control information indicates one of the frequency division multiplexing mapping scheme, the time division multiplexing mapping scheme, or the space division multiplexing mapping scheme for mapping of the one or more activated TCI states.

12. The method of claim 1, wherein the control information comprises a third indication of a group of component carriers to which the control information pertains.

13. The method of claim 1, wherein the control information is a medium access control (MAC) control element.

14. The method of claim 2, wherein the configuration message is a radio resource control message.

15. An apparatus for wireless communication by a user equipment (UE), comprising:
a processor,
memory coupled with the processor; and
instructions stored in the memory and executable by the processor to cause the apparatus to:
receive, from a network device, a configuration message indicating that a control resource set for a downlink control channel is associated with a plurality of transmission configuration indicator (TCI) states;
receive, from the network device, control information activating one or more TCI states of the plurality of TCI states for the control resource set, the plurality of TCI states comprising at least a first TCI state and a second TCI state, wherein the control information comprises a first indication of the first TCI state and a second indication of whether the first TCI state is activated or the first TCI state and the second TCI state are activated; and
decode the downlink control channel based at least in part on the configuration message and the one or more activated TCI states.

16. The apparatus of claim 15, wherein the instructions are further executable by the processor to cause the apparatus to:
determine, based at least in part on the control information comprising the second indication that the first TCI state is activated, that a single TCI states is activated for the control resource set; and
identify that the first TCI state is activated based at least in part on the second indication, wherein the one or more activated TCI states comprise the first TCI state.

17. The apparatus of claim 15, wherein the instructions are further executable by the processor to cause the apparatus to:
determine, based at least in part on the control information comprising the second indication that the first TCI state and the second TCI state are activated, that two TCI states are activated for the control resource set;
identify that that first TCI state is activated based at least in part on the second indication; and
identify that the second TCI state is activated based at least in part on the second indication, wherein the one or more activated TCI states comprise the first TCI state and the second TCI state.

18. The apparatus of claim 15, wherein the first indication comprises a TCI state identification.

19. The apparatus of claim 15, wherein the first indication comprises an index associated with the first TCI state.

20. The apparatus of claim 15, wherein the control information comprises a first field comprising the first indication, a second field comprising a third indication of the second TCI state, and a third field comprising the second indication.

21. The apparatus of claim 20, wherein the third field is configured to indicate whether the control information comprises the second field.

22. The apparatus of claim 15, wherein the control information comprises a dynamic number of fields based at least in part on a quantity of activated TCI states.

23. The apparatus of claim 15, wherein the configuration message further indicates that the plurality of TCI states are mapped using either a frequency division multiplexing mapping, a time division multiplexing mapping, or a space division multiplexing mapping.

24. The apparatus of claim 15, wherein:
the configuration message further indicates parameters for mapping the plurality of TCI states using at least two of a frequency division multiplexing mapping scheme, a time division multiplexing mapping scheme, and a space division multiplexing mapping scheme; and
the control information indicates one of the frequency division multiplexing mapping scheme, the time division multiplexing mapping scheme, or the space division multiplexing mapping scheme for mapping of the one or more activated TCI states.

25. The apparatus of claim 15, wherein the control information comprises a third indication of a group of component carriers to which the control information pertains.

26. The apparatus of claim 15, wherein the control information is a medium access control (MAC) control element.

27. The apparatus of claim 15, wherein the configuration message is a radio resource control message.

28. A non-transitory computer-readable medium storing code for wireless communication at a user equipment (UE), the code comprising instructions executable by a processor to:
  receive, from a network device, a configuration message indicating that a control resource set for a downlink control channel is associated with a plurality of transmission configuration indicator (TCI) states;
  receive, from the network device, control information activating one or more TCI states of the plurality of TCI states for the control resource set, the plurality of TCI states comprising at least a first TCI state and a second TCI state, wherein the control information comprises a first indication of the first TCI state and a second indication of whether the first TCI state is activated or the first TCI state and the second TCI state are activated; and
  decode the downlink control channel based at least in part on the configuration message and the one or more activated TCI states.

29. The non-transitory computer-readable medium of claim 28, wherein the instructions are further executable by the processor to:
  determine, based at least in part on the control information comprising the second indication that the first TCI state is activated, that a single TCI states is activated for the control resource set; and
  identify that the first TCI state is activated based at least in part on the second indication, wherein the one or more activated TCI states comprise the first TCI state.

30. An apparatus for wireless communications at a user equipment (UE), comprising:
  means for receiving, from a network device, a configuration message indicating that a control resource set for a downlink control channel is associated with a plurality of transmission configuration indicator (TCI) states;
  means for receiving, from the network device, control information activating one or more TCI states of the plurality of TCI states for the control resource set, the plurality of TCI states comprising at least a first TCI state and a second TCI state, wherein the control information comprises a first indication of the first TCI state and a second indication of whether the first TCI state is activated or the first TCI state and the second TCI state are activated; and
  means for decoding the downlink control channel based at least in part on the configuration message and the one or more activated TCI states.

\* \* \* \* \*